United States Patent
Zweigle et al.

(10) Patent No.: US 10,203,413 B2
(45) Date of Patent: Feb. 12, 2019

(54) USING A TWO-DIMENSIONAL SCANNER TO SPEED REGISTRATION OF THREE-DIMENSIONAL SCAN DATA

(71) Applicant: FARO Technologies, Inc., Lake Mary, FL (US)

(72) Inventors: Oliver Zweigle, Stuttgart (DE); Bernd-Dietmar Becker, Ludwigsburg (DE); Reinhard Becker, Ludwigsburg (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

(21) Appl. No.: 15/681,862

(22) Filed: Aug. 21, 2017

(65) Prior Publication Data

US 2017/0343674 A1   Nov. 30, 2017

Related U.S. Application Data

(63) Continuation of application No. 14/559,290, filed on Dec. 3, 2014, now Pat. No. 9,739,886, which is a
(Continued)

(30) Foreign Application Priority Data

Oct. 5, 2012  (DE) .................. 10 2012 109 481

(51) Int. Cl.
   *G01S 17/42*   (2006.01)
   *B25J 13/08*   (2006.01)
   (Continued)

(52) U.S. Cl.
   CPC .............. *G01S 17/42* (2013.01); *B25J 13/08* (2013.01); *G01B 11/002* (2013.01);
   (Continued)

(58) Field of Classification Search
   CPC .......................... H04N 13/0221; G06T 17/20
   See application file for complete search history.

(56) References Cited

U.S. PATENT DOCUMENTS

| 1,535,312 A | 4/1925 | Hosking |
| 1,538,758 A | 5/1925 | Taylor |

(Continued)

FOREIGN PATENT DOCUMENTS

| AT | 506110 A1 | 6/2009 |
| AT | 508635 A1 | 3/2011 |

(Continued)

OTHER PUBLICATIONS

Cho, Yong K., et al. "Light-weight 3D ladar system for construction robotic operations" 26th International Symposium on Automation and Robotics in Construction (ISARC 2009), 2009, XP55068755, Retrieved from Internet: URL:http://www.iaarc.org/publications/fulltext/Light-weight_3D_ladar_system_for_construction_robotic_operations.pdf [retrieved on Jun. 28, 2013].

(Continued)

*Primary Examiner* — Luke D Ratcliffe
(74) *Attorney, Agent, or Firm* — Cantor Colburn LLP

(57) ABSTRACT

A method for measuring and registering 3D coordinates has a 3D scanner measure a first collection of 3D coordinates of points from a first registration position. A 2D scanner collects horizontal 2D scan sets as 3D measuring device moves from first to second registration positions. A processor determines first and second translation values and a first rotation value based on collected 2D scan sets. 3D scanner measures a second collection of 3D coordinates of points from second registration position. Processor adjusts second collection of points relative to first collection of points based at least in part on first and second translation values and first rotation value. Processor identifies a correspondence among registration targets in first and second collection of 3D (Continued)

coordinates, and uses this correspondence to further adjust the relative position and orientation of first and second collection of 3D coordinates.

13 Claims, 14 Drawing Sheets

Related U.S. Application Data continuation of application No. PCT/IB2013/003082, filed on Sep. 27, 2013.

(60) Provisional application No. 61/716,845, filed on Oct. 22, 2012.

(51) Int. Cl.

| | | |
|---|---|---|
| *G01S 17/88* | (2006.01) | |
| *G01S 17/89* | (2006.01) | |
| *G01S 7/00* | (2006.01) | |
| *G01S 7/481* | (2006.01) | |
| *G05D 1/02* | (2006.01) | |
| *G09B 29/00* | (2006.01) | |
| *G01B 11/00* | (2006.01) | |
| *G01B 11/27* | (2006.01) | |
| *G01S 17/36* | (2006.01) | |
| *G01C 15/00* | (2006.01) | |
| *G01S 7/48* | (2006.01) | |
| *G01C 7/04* | (2006.01) | |
| *G01S 17/02* | (2006.01) | |
| *G01S 17/87* | (2006.01) | |

(52) U.S. Cl.
CPC .......... *G01B 11/272* (2013.01); *G01C 15/002* (2013.01); *G01S 7/003* (2013.01); *G01S 7/4808* (2013.01); *G01S 7/4813* (2013.01); *G01S 7/4817* (2013.01); *G01S 17/36* (2013.01); *G01S 17/88* (2013.01); *G01S 17/89* (2013.01); *G05D 1/024* (2013.01); *G05D 1/0274* (2013.01); *G09B 29/004* (2013.01); *G01C 7/04* (2013.01); *G01S 17/023* (2013.01); *G01S 17/87* (2013.01); *G05D 2201/0207* (2013.01)

(56) References Cited

U.S. PATENT DOCUMENTS

| | | |
|---|---|---|
| 1,918,813 A | 7/1933 | Kinzy |
| 2,316,573 A | 4/1943 | Egy |
| 2,333,243 A | 11/1943 | Glab |
| 2,702,683 A | 2/1955 | Green et al. |
| 2,748,926 A | 6/1956 | Leahy |
| 2,983,367 A | 6/1958 | Paramater et al. |
| 2,924,495 A | 9/1958 | Haines |
| 2,966,257 A | 12/1960 | Littlejohn |
| 3,066,790 A | 12/1962 | Armbruster |
| 3,447,852 A | 6/1969 | Barlow |
| 3,458,167 A | 7/1969 | Cooley, Jr. |
| 3,830,567 A | 8/1974 | Riegl |
| 3,899,145 A | 8/1975 | Stephenson |
| 3,945,729 A | 3/1976 | Rosen |
| 4,138,045 A | 2/1979 | Baker |
| 4,178,515 A | 12/1979 | Tarasevich |
| 4,340,008 A | 7/1982 | Mendelson |
| 4,379,461 A | 4/1983 | Nilsson et al. |
| 4,413,907 A | 11/1983 | Lane |
| 4,424,899 A | 1/1984 | Rosenberg |
| 4,430,796 A | 2/1984 | Nakagawa |
| 4,457,625 A | 7/1984 | Greenleaf et al. |
| 4,506,448 A | 3/1985 | Topping et al. |
| 4,537,233 A | 8/1985 | Vroonland et al. |
| 4,544,236 A | 10/1985 | Endo |
| 4,561,776 A | 12/1985 | Pryor |
| 4,606,696 A | 8/1986 | Slocum |
| 4,659,280 A | 4/1987 | Akeel |
| 4,663,852 A | 5/1987 | Guarini |
| 4,664,588 A | 5/1987 | Newell et al. |
| 4,667,231 A | 5/1987 | Pryor |
| 4,676,002 A | 6/1987 | Slocum |
| 4,714,339 A | 12/1987 | Lau et al. |
| 4,733,961 A | 3/1988 | Mooney |
| 4,736,218 A | 4/1988 | Kutman |
| 4,751,950 A | 6/1988 | Bock |
| 4,767,257 A | 8/1988 | Kato |
| 4,790,651 A | 12/1988 | Brown et al. |
| 4,816,822 A | 3/1989 | Vache et al. |
| 4,870,274 A | 9/1989 | Hebert et al. |
| 4,882,806 A | 11/1989 | Davis |
| 4,891,509 A | 1/1990 | Jones et al. |
| 4,954,952 A | 9/1990 | Ubhayakar et al. |
| 4,982,841 A | 1/1991 | Goedecke |
| 4,984,881 A | 1/1991 | Osada et al. |
| 4,996,909 A | 3/1991 | Vache et al. |
| 4,999,491 A | 3/1991 | Semler et al. |
| 5,021,641 A | 6/1991 | Swartz et al. |
| 5,025,966 A | 6/1991 | Potter |
| 5,027,951 A | 7/1991 | Johnson |
| 5,068,971 A | 12/1991 | Simon |
| 5,069,524 A | 12/1991 | Watanabe et al. |
| 5,155,684 A | 10/1992 | Burke et al. |
| 5,168,532 A | 12/1992 | Seppi et al. |
| 5,189,797 A | 3/1993 | Granger |
| 5,205,111 A | 4/1993 | Johnson |
| 5,211,476 A | 5/1993 | Coudroy |
| 5,212,738 A | 5/1993 | Chande et al. |
| 5,213,240 A | 5/1993 | Dietz et al. |
| 5,216,479 A | 6/1993 | Dotan et al. |
| 5,218,427 A | 6/1993 | Koch |
| 5,219,423 A | 6/1993 | Kamaya |
| 5,239,855 A | 8/1993 | Schleifer et al. |
| 5,289,264 A | 2/1994 | Steinbichler |
| 5,289,265 A | 2/1994 | Inoue et al. |
| 5,289,855 A | 3/1994 | Baker et al. |
| 5,313,261 A | 5/1994 | Leatham et al. |
| 5,319,445 A | 6/1994 | Fitts |
| 5,329,347 A | 7/1994 | Wallace et al. |
| 5,329,467 A | 7/1994 | Nagamune et al. |
| 5,332,315 A | 7/1994 | Baker et al. |
| 5,337,149 A | 8/1994 | Kozah et al. |
| 5,371,347 A | 12/1994 | Plesko |
| 5,372,250 A | 12/1994 | Johnson |
| 5,373,346 A | 12/1994 | Rocker |
| 5,402,365 A | 3/1995 | Kozikaro et al. |
| 5,402,582 A | 4/1995 | Raab |
| 5,412,880 A | 5/1995 | Raab |
| 5,416,505 A | 5/1995 | Eguchi et al. |
| 5,430,384 A | 7/1995 | Hocker |
| 5,446,846 A | 8/1995 | Lennartsson |
| 5,455,670 A | 10/1995 | Payne et al. |
| 5,455,993 A | 10/1995 | Link et al. |
| 5,510,977 A | 4/1996 | Raab |
| 5,517,297 A | 5/1996 | Stenton |
| 5,528,354 A | 6/1996 | Uwira |
| 5,528,505 A | 6/1996 | Granger et al. |
| 5,535,524 A | 7/1996 | Carrier et al. |
| 5,563,655 A | 10/1996 | Lathrop |
| 5,577,130 A | 11/1996 | Wu |
| 5,611,147 A | 3/1997 | Raab |
| 5,615,489 A | 4/1997 | Breyer et al. |
| 5,623,416 A | 4/1997 | Hocker, III |
| 5,629,756 A | 5/1997 | Kitajima |
| 5,668,631 A | 9/1997 | Norita et al. |
| 5,675,326 A | 10/1997 | Juds et al. |
| 5,677,760 A | 10/1997 | Mikami et al. |
| 5,682,508 A | 10/1997 | Hocker, III |
| 5,716,036 A | 2/1998 | Isobe et al. |
| 5,724,264 A | 3/1998 | Rosenberg et al. |
| 5,734,417 A | 3/1998 | Yamamoto et al. |
| 5,745,050 A | 4/1998 | Nakagawa |
| 5,745,225 A | 4/1998 | Watanabe et al. |

(56) References Cited

U.S. PATENT DOCUMENTS

| | | |
|---|---|---|
| 5,752,112 A | 5/1998 | Paddock et al. |
| 5,754,449 A | 5/1998 | Hoshal et al. |
| 5,754,680 A | 5/1998 | Sato |
| 5,768,792 A | 6/1998 | Raab |
| 5,793,993 A | 8/1998 | Broedner et al. |
| 5,804,805 A | 9/1998 | Koenck et al. |
| 5,825,666 A | 10/1998 | Freifeld |
| 5,829,148 A | 11/1998 | Eaton |
| 5,831,719 A | 11/1998 | Berg et al. |
| 5,832,416 A | 11/1998 | Anderson |
| 5,844,591 A | 12/1998 | Takamatsu et al. |
| 5,856,874 A | 1/1999 | Tachibana et al. |
| 5,887,122 A | 3/1999 | Terawaki et al. |
| 5,894,123 A | 4/1999 | Ohtomo et al. |
| 5,898,484 A | 4/1999 | Harris |
| 5,898,490 A | 4/1999 | Ohtomo et al. |
| 5,909,939 A | 6/1999 | Fugmann |
| 5,926,782 A | 7/1999 | Raab |
| 5,933,267 A | 8/1999 | Ishizuka |
| 5,936,721 A | 8/1999 | Ohtomo et al. |
| 5,940,170 A | 8/1999 | Berg et al. |
| 5,940,181 A | 8/1999 | Tsubono et al. |
| 5,949,530 A | 9/1999 | Wetteborn |
| 5,956,661 A | 9/1999 | Lefebvre et al. |
| 5,956,857 A | 9/1999 | Raab |
| 5,969,321 A | 10/1999 | Danielson et al. |
| 5,973,788 A | 10/1999 | Pettersen et al. |
| 5,978,748 A | 11/1999 | Raab |
| 5,983,936 A | 11/1999 | Schwieterman et al. |
| 5,988,862 A | 11/1999 | Kacyra et al. |
| 5,991,011 A | 11/1999 | Damm |
| 5,996,790 A | 12/1999 | Yamada et al. |
| 5,997,779 A | 12/1999 | Potter |
| 6,040,898 A | 3/2000 | Mrosik et al. |
| D423,534 S | 4/2000 | Raab et al. |
| 6,050,615 A | 4/2000 | Weinhold |
| 6,057,915 A | 5/2000 | Squire et al. |
| 6,060,889 A | 5/2000 | Rocker |
| 6,067,116 A | 5/2000 | Yamano et al. |
| 6,069,700 A | 5/2000 | Rudnick et al. |
| 6,077,306 A | 6/2000 | Metzger et al. |
| 6,112,423 A | 9/2000 | Sheehan |
| 6,115,511 A | 9/2000 | Sakai et al. |
| 6,125,337 A | 9/2000 | Rosenberg et al. |
| 6,131,299 A | 10/2000 | Raab et al. |
| 6,134,507 A | 10/2000 | Markey, Jr. et al. |
| 6,138,915 A | 10/2000 | Danielson et al. |
| 6,149,112 A | 11/2000 | Thieltges |
| 6,151,789 A | 11/2000 | Raab et al. |
| 6,163,294 A | 12/2000 | Talbot |
| 6,166,504 A | 12/2000 | Iida et al. |
| 6,166,809 A | 12/2000 | Pettersen et al. |
| 6,166,811 A | 12/2000 | Long et al. |
| 6,204,651 B1 | 3/2001 | Marcus et al. |
| 6,204,961 B1 | 3/2001 | Anderson et al. |
| 6,219,928 B1 | 4/2001 | Raab et al. |
| D441,632 S | 5/2001 | Raab et al. |
| 6,240,651 B1 | 6/2001 | Schroeder et al. |
| 6,246,468 B1 | 6/2001 | Dimsdale |
| 6,253,458 B1 | 7/2001 | Raab et al. |
| 6,282,195 B1 | 8/2001 | Miller et al. |
| 6,285,390 B1 | 9/2001 | Blake |
| 6,298,569 B1 | 10/2001 | Raab et al. |
| 6,339,410 B1 | 1/2002 | Milner et al. |
| 6,349,249 B1 | 2/2002 | Cunningham |
| 6,366,831 B1 | 4/2002 | Raab |
| 6,408,252 B1 | 6/2002 | De Smet |
| 6,418,774 B1 | 7/2002 | Brogaardh et al. |
| 6,438,507 B1 | 8/2002 | Imai |
| 6,438,856 B1 | 8/2002 | Kaczynski |
| 6,442,419 B1 | 8/2002 | Chu et al. |
| 6,445,446 B1 | 9/2002 | Kumagai et al. |
| 6,460,004 B2 | 10/2002 | Greer et al. |
| 6,470,584 B1 | 10/2002 | Stoodley |
| 6,477,784 B2 | 11/2002 | Schroeder et al. |
| 6,480,270 B1 | 11/2002 | Studnicka et al. |
| 6,483,106 B1 | 11/2002 | Ohtomo et al. |
| 6,497,394 B1 | 12/2002 | Dunchock |
| 6,504,602 B1 | 1/2003 | Hinderling |
| 6,512,575 B1 | 1/2003 | Marchi |
| 6,519,860 B1 | 2/2003 | Bieg et al. |
| D472,824 S | 4/2003 | Raab et al. |
| 6,542,249 B1 * | 4/2003 | Kofman ............ G01B 11/2513 356/601 |
| 6,547,397 B1 | 4/2003 | Kaufman et al. |
| 6,598,306 B2 | 7/2003 | Eaton |
| 6,611,346 B2 | 8/2003 | Granger |
| 6,611,617 B1 | 8/2003 | Crampton |
| D479,544 S | 9/2003 | Raab et al. |
| 6,612,044 B2 | 9/2003 | Raab et al. |
| 6,621,065 B1 | 9/2003 | Fukumoto et al. |
| 6,626,339 B2 | 9/2003 | Gates et al. |
| 6,633,051 B1 | 10/2003 | Holloway et al. |
| 6,649,208 B2 | 11/2003 | Rodgers |
| 6,650,402 B2 | 11/2003 | Sullivan et al. |
| 6,668,466 B1 | 12/2003 | Bieg et al. |
| 6,675,122 B1 | 1/2004 | Markendorf et al. |
| 6,681,495 B2 | 1/2004 | Masayuki et al. |
| 6,710,859 B2 | 3/2004 | Shirai et al. |
| D490,831 S | 6/2004 | Raab et al. |
| D491,210 S | 6/2004 | Raab et al. |
| 6,750,873 B1 | 6/2004 | Bernardini et al. |
| 6,753,876 B2 | 6/2004 | Brooksby et al. |
| 6,759,649 B2 | 7/2004 | Hipp |
| 6,759,979 B2 | 7/2004 | Vashisth et al. |
| 6,764,185 B1 | 7/2004 | Beardsley et al. |
| 6,789,327 B2 | 9/2004 | Roth et al. |
| 6,820,346 B2 | 11/2004 | Raab et al. |
| 6,822,749 B1 | 11/2004 | Christoph |
| 6,825,923 B2 | 11/2004 | Hamar et al. |
| 6,826,664 B2 | 11/2004 | Hocker, III et al. |
| 6,847,436 B2 | 1/2005 | Bridges |
| 6,856,381 B2 | 2/2005 | Christoph |
| 6,858,836 B1 | 2/2005 | Hartrumpf |
| 6,859,269 B2 | 2/2005 | Ohtomo et al. |
| 6,862,097 B2 | 3/2005 | Yanagisawa et al. |
| 6,868,359 B2 | 3/2005 | Raab |
| 6,879,933 B2 | 4/2005 | Steffey et al. |
| 6,889,903 B1 | 5/2005 | Koenck |
| 6,892,465 B2 | 5/2005 | Raab et al. |
| 6,894,767 B2 | 5/2005 | Ishinabe et al. |
| 6,895,347 B2 | 5/2005 | Dorny et al. |
| 6,901,673 B1 | 6/2005 | Cobb et al. |
| 6,904,691 B2 | 6/2005 | Raab et al. |
| 6,914,678 B1 | 7/2005 | Ulrichsen et al. |
| 6,917,415 B2 | 7/2005 | Gogolla et al. |
| 6,920,697 B2 | 7/2005 | Raab et al. |
| 6,922,234 B2 | 7/2005 | Hoffman et al. |
| 6,922,252 B2 | 7/2005 | Harvill et al. |
| 6,925,722 B2 | 8/2005 | Raab et al. |
| 6,931,745 B2 | 8/2005 | Granger |
| 6,935,036 B2 | 8/2005 | Raab et al. |
| 6,935,748 B2 | 8/2005 | Kaufman et al. |
| 6,948,255 B2 | 9/2005 | Russell |
| 6,957,496 B2 | 10/2005 | Raab et al. |
| 6,965,843 B2 | 11/2005 | Raab et al. |
| 6,973,734 B2 | 12/2005 | Raab et al. |
| 6,988,322 B2 | 1/2006 | Raab et al. |
| 6,989,890 B2 | 1/2006 | Riegl et al. |
| 7,003,892 B2 | 2/2006 | Eaton et al. |
| 7,006,084 B1 | 2/2006 | Buss et al. |
| 7,024,032 B2 | 4/2006 | Kidd et al. |
| 7,029,126 B2 | 4/2006 | Tang |
| 7,032,321 B2 | 4/2006 | Raab et al. |
| 7,040,136 B2 | 5/2006 | Forss et al. |
| 7,051,447 B2 | 5/2006 | Kikuchi et al. |
| 7,069,124 B1 | 6/2006 | Whittaker et al. |
| 7,069,875 B2 | 7/2006 | Warecki |
| 7,076,420 B1 | 7/2006 | Snyder et al. |
| 7,106,421 B2 | 9/2006 | Matsuura et al. |
| 7,117,107 B2 | 10/2006 | Dorny et al. |
| 7,120,092 B2 | 10/2006 | Del Prado Pavon et al. |
| 7,127,822 B2 | 10/2006 | Kumagai et al. |
| 7,136,153 B2 | 11/2006 | Mori et al. |

(56) References Cited

U.S. PATENT DOCUMENTS

| | | |
|---|---|---|
| 7,140,213 B2 | 11/2006 | Feucht et al. |
| 7,142,289 B2 | 11/2006 | Ando et al. |
| 7,145,926 B2 | 12/2006 | Vitruk et al. |
| 7,152,456 B2 | 12/2006 | Eaton |
| 7,174,651 B2 | 2/2007 | Raab et al. |
| 7,180,072 B2 | 2/2007 | Persi et al. |
| 7,184,047 B1 | 2/2007 | Crampton |
| 7,190,465 B2 | 3/2007 | Froehlich et al. |
| 7,191,541 B1 | 3/2007 | Weekers et al. |
| 7,193,690 B2 | 3/2007 | Ossig et al. |
| 7,199,872 B2 | 4/2007 | Van Cranenbroeck |
| 7,200,246 B2 | 4/2007 | Cofer et al. |
| 7,202,941 B2 | 4/2007 | Munro |
| 7,230,689 B2 | 6/2007 | Lau |
| 7,242,590 B1 | 7/2007 | Yeap et al. |
| 7,246,030 B2 | 7/2007 | Raab et al. |
| 7,249,421 B2 | 7/2007 | MacManus et al. |
| 7,256,899 B1 | 8/2007 | Faul et al. |
| 7,269,910 B2 | 9/2007 | Raab et al. |
| D551,943 S | 10/2007 | Hodjat et al. |
| 7,285,793 B2 | 10/2007 | Rusted |
| 7,296,364 B2 | 11/2007 | Seitz et al. |
| 7,296,955 B2 | 11/2007 | Dreier |
| 7,296,979 B2 | 11/2007 | Raab et al. |
| 7,306,339 B2 | 12/2007 | Kaufman et al. |
| 7,307,701 B2 | 12/2007 | Hoffman, II |
| 7,312,862 B2 | 12/2007 | Zumbrunn et al. |
| 7,313,264 B2 | 12/2007 | Crampton |
| D559,657 S | 1/2008 | Wohlford et al. |
| 7,319,512 B2 | 1/2008 | Ohtomo et al. |
| 7,330,242 B2 | 2/2008 | Reichert et al. |
| 7,337,344 B2 | 2/2008 | Barman et al. |
| 7,342,650 B2 | 3/2008 | Kern et al. |
| 7,348,822 B2 | 3/2008 | Baer |
| 7,352,446 B2 | 4/2008 | Bridges et al. |
| 7,360,648 B1 | 4/2008 | Blaschke |
| 7,372,558 B2 | 5/2008 | Kaufman et al. |
| 7,372,581 B2 | 5/2008 | Raab et al. |
| 7,383,638 B2 | 6/2008 | Granger |
| 7,388,654 B2 | 6/2008 | Raab et al. |
| 7,389,870 B2 | 6/2008 | Slappay |
| 7,395,606 B2 | 7/2008 | Crampton |
| 7,400,384 B1 | 7/2008 | Evans et al. |
| 7,403,268 B2 | 7/2008 | England et al. |
| 7,403,269 B2 | 7/2008 | Yamashita et al. |
| 7,430,068 B2 | 9/2008 | Becker et al. |
| 7,430,070 B2 | 9/2008 | Soreide et al. |
| 7,432,686 B2 | 10/2008 | Erdman et al. |
| 7,441,341 B2 | 10/2008 | Eaton |
| 7,443,555 B2 | 10/2008 | Blug et al. |
| 7,447,359 B2 | 11/2008 | Tu et al. |
| 7,447,360 B2 | 11/2008 | Li et al. |
| 7,447,931 B1 | 11/2008 | Rischar et al. |
| 7,449,876 B2 | 11/2008 | Pleasant et al. |
| 7,454,265 B2 | 11/2008 | Marsh |
| 7,463,368 B2 | 12/2008 | Morden et al. |
| 7,477,359 B2 | 1/2009 | England et al. |
| 7,477,360 B2 | 1/2009 | England et al. |
| 7,480,037 B2 | 1/2009 | Palmateer et al. |
| 2,452,033 A1 | 2/2009 | Born |
| 7,508,496 B2 | 3/2009 | Mettenleiter et al. |
| 7,508,971 B2 | 3/2009 | Vaccaro et al. |
| 7,515,256 B2 | 4/2009 | Ohtomo et al. |
| 7,525,276 B2 | 4/2009 | Eaton |
| 7,527,205 B2 | 5/2009 | Zhu et al. |
| 7,528,768 B2 | 5/2009 | Wakayama et al. |
| 7,541,830 B2 | 6/2009 | Fahrbach et al. |
| 7,545,517 B2 | 6/2009 | Rueb et al. |
| 7,546,689 B2 | 6/2009 | Ferrari et al. |
| 7,551,771 B2 | 6/2009 | England, III |
| 7,552,644 B2 | 6/2009 | Haase et al. |
| 7,557,824 B2 | 7/2009 | Holliman |
| 7,561,598 B2 | 7/2009 | Stratton et al. |
| 7,564,250 B2 | 7/2009 | Hocker |
| 7,568,293 B2 | 8/2009 | Ferrari |
| 7,578,069 B2 | 8/2009 | Eaton |
| D599,226 S | 9/2009 | Gerent et al. |
| 7,589,595 B2 | 9/2009 | Cutler |
| 7,589,825 B2 | 9/2009 | Orchard et al. |
| 7,591,077 B2 | 9/2009 | Pettersson |
| 7,591,078 B2 | 9/2009 | Crampton |
| 7,599,106 B2 | 10/2009 | Matsumoto et al. |
| 7,600,061 B2 | 10/2009 | Honda |
| 7,602,873 B2 | 10/2009 | Eidson |
| 7,604,207 B2 | 10/2009 | Hasloecher et al. |
| 7,610,175 B2 | 10/2009 | Eidson |
| 7,614,157 B2 | 11/2009 | Granger |
| 7,624,510 B2 | 12/2009 | Ferrari |
| 7,625,335 B2 | 12/2009 | Deichmann et al. |
| 7,626,690 B2 | 12/2009 | Kumagai et al. |
| D607,350 S | 1/2010 | Cooduvalli et al. |
| 7,656,751 B2 | 2/2010 | Rischar et al. |
| 7,659,995 B2 | 2/2010 | Knighton et al. |
| D610,926 S | 3/2010 | Gerent et al. |
| 7,693,325 B2 | 4/2010 | Pulla et al. |
| 7,697,748 B2 | 4/2010 | Dimsdale et al. |
| 7,701,592 B2 | 4/2010 | Saint Clair et al. |
| 7,712,224 B2 | 5/2010 | Hicks |
| 7,721,396 B2 | 5/2010 | Fleischman |
| 7,728,833 B2 | 6/2010 | Verma et al. |
| 7,728,963 B2 | 6/2010 | Kirschner |
| 7,733,544 B2 | 6/2010 | Becker et al. |
| 7,735,234 B2 | 6/2010 | Briggs et al. |
| 7,743,524 B2 | 6/2010 | Eaton et al. |
| 7,752,003 B2 | 7/2010 | MacManus |
| 7,756,615 B2 | 7/2010 | Barfoot et al. |
| 7,765,707 B2 | 8/2010 | Tomelleri |
| 7,769,559 B2 | 8/2010 | Reichert |
| 7,774,949 B2 | 8/2010 | Ferrari |
| 7,777,761 B2 | 8/2010 | England et al. |
| 7,779,548 B2 | 8/2010 | Ferrari |
| 7,779,553 B2 | 8/2010 | Jordil et al. |
| 7,784,194 B2 | 8/2010 | Raab et al. |
| 7,787,670 B2 | 8/2010 | Urushiya |
| 7,793,425 B2 | 9/2010 | Bailey |
| 7,798,453 B2 | 9/2010 | Maningo et al. |
| 7,800,758 B1 | 9/2010 | Bridges et al. |
| 7,804,602 B2 | 9/2010 | Raab |
| 7,805,851 B2 | 10/2010 | Pettersson |
| 7,805,854 B2 | 10/2010 | Eaton |
| 7,809,518 B2 | 10/2010 | Zhu et al. |
| 7,834,985 B2 | 11/2010 | Morcom |
| 7,847,922 B2 | 12/2010 | Gittinger et al. |
| RE42,055 E | 1/2011 | Raab |
| 7,869,005 B2 | 1/2011 | Ossig et al. |
| RE42,082 E | 2/2011 | Raab et al. |
| 7,881,896 B2 | 2/2011 | Atwell et al. |
| 7,889,324 B2 | 2/2011 | Yamamoto |
| 7,891,248 B2 | 2/2011 | Hough et al. |
| 7,900,714 B2 | 3/2011 | Milbourne et al. |
| 7,903,245 B2 | 3/2011 | Miousset et al. |
| 7,903,261 B2 | 3/2011 | Saint Clair et al. |
| 7,908,757 B2 | 3/2011 | Ferrari |
| 7,933,055 B2 | 4/2011 | Jensen et al. |
| 7,935,928 B2 | 5/2011 | Serger et al. |
| 7,965,747 B2 | 6/2011 | Kumano |
| 7,974,461 B2 | 7/2011 | England |
| 7,982,866 B2 | 7/2011 | Vogel |
| D643,319 S | 8/2011 | Ferrari et al. |
| 7,990,397 B2 | 8/2011 | Bukowski et al. |
| 7,994,465 B1 | 8/2011 | Bamji et al. |
| 7,995,834 B1 | 8/2011 | Knighton et al. |
| 8,001,697 B2 | 8/2011 | Danielson et al. |
| 8,020,657 B2 | 9/2011 | Allard et al. |
| 8,022,812 B2 | 9/2011 | Beniyama et al. |
| 8,028,432 B2 | 10/2011 | Bailey et al. |
| 8,036,775 B2 | 10/2011 | Matsumoto et al. |
| 8,045,762 B2 | 10/2011 | Otani et al. |
| 8,051,710 B2 | 11/2011 | Van Dam et al. |
| 8,052,857 B2 | 11/2011 | Townsend |
| 8,064,046 B2 | 11/2011 | Ossig et al. |
| 8,065,861 B2 | 11/2011 | Caputo |
| 8,082,673 B2 | 12/2011 | Desforges et al. |
| 8,099,877 B2 | 1/2012 | Champ |

(56) References Cited

U.S. PATENT DOCUMENTS

| | | |
|---|---|---|
| 8,117,668 B2 | 2/2012 | Crampton et al. |
| 8,123,350 B2 | 2/2012 | Cannell et al. |
| 8,152,071 B2 | 4/2012 | Doherty et al. |
| D659,035 S | 5/2012 | Ferrari et al. |
| 8,171,650 B2 | 5/2012 | York et al. |
| 8,179,936 B2 | 5/2012 | Bueche et al. |
| D662,427 S | 6/2012 | Bailey et al. |
| 8,218,131 B2 | 7/2012 | Otani et al. |
| 8,224,032 B2 | 7/2012 | Fuchs et al. |
| 8,260,483 B2 | 9/2012 | Barfoot et al. |
| 8,269,984 B2 | 9/2012 | Hinderling et al. |
| 8,276,286 B2 | 10/2012 | Bailey et al. |
| 8,284,407 B2 | 10/2012 | Briggs et al. |
| 8,310,653 B2 | 11/2012 | Ogawa et al. |
| 8,321,612 B2 | 11/2012 | Hartwich et al. |
| 8,346,392 B2 | 1/2013 | Walser et al. |
| 8,346,480 B2 | 1/2013 | Trepagnier et al. |
| 8,352,212 B2 | 1/2013 | Fetter et al. |
| 8,353,059 B2 | 1/2013 | Crampton et al. |
| D676,341 S | 2/2013 | Bailey et al. |
| 8,379,191 B2 | 2/2013 | Braunecker et al. |
| 8,381,704 B2 | 2/2013 | Debelak et al. |
| 8,384,914 B2 | 2/2013 | Becker et al. |
| D678,085 S | 3/2013 | Bailey et al. |
| 8,391,565 B2 | 3/2013 | Purcell et al. |
| 8,402,669 B2 | 3/2013 | Ferrari et al. |
| 8,422,035 B2 | 4/2013 | Hinderling et al. |
| 8,497,901 B2 | 7/2013 | Pettersson |
| 8,533,967 B2 | 9/2013 | Bailey et al. |
| 8,537,374 B2 | 9/2013 | Briggs et al. |
| 8,619,265 B2 | 12/2013 | Steffey et al. |
| 8,645,022 B2 | 2/2014 | Yoshimura et al. |
| 8,659,748 B2 | 2/2014 | Dakin et al. |
| 8,659,752 B2 | 2/2014 | Cramer et al. |
| 8,661,700 B2 | 3/2014 | Briggs et al. |
| 8,677,643 B2 | 3/2014 | Bridges et al. |
| 8,699,007 B2 | 4/2014 | Becker et al. |
| 8,705,012 B2 | 4/2014 | Greiner et al. |
| 8,705,016 B2 | 4/2014 | Schumann et al. |
| 8,718,837 B2 | 5/2014 | Wang et al. |
| 8,784,425 B2 | 7/2014 | Ritchey et al. |
| 8,797,552 B2 | 8/2014 | Suzuki et al. |
| 8,811,767 B2 | 8/2014 | Veeraraghavan et al. |
| 8,830,485 B2 | 9/2014 | Woloschyn |
| 9,001,312 B2 | 4/2015 | Matsubara et al. |
| 9,113,023 B2 | 8/2015 | Bridges et al. |
| 9,279,662 B2 | 3/2016 | Steffey et al. |
| 9,372,265 B2 | 6/2016 | Zweigle et al. |
| 9,383,587 B2 | 7/2016 | Balogh |
| 9,664,508 B2 | 5/2017 | McAfee et al. |
| 9,678,211 B2 | 6/2017 | Ossig |
| 2001/0004269 A1 | 6/2001 | Shibata et al. |
| 2002/0015934 A1 | 2/2002 | Rubbert et al. |
| 2002/0032541 A1 | 3/2002 | Raab et al. |
| 2002/0059042 A1 | 5/2002 | Kacyra et al. |
| 2002/0087233 A1 | 7/2002 | Raab |
| 2002/0128790 A1 | 9/2002 | Woodmansee |
| 2002/0143506 A1 | 10/2002 | D'Aligny et al. |
| 2002/0149694 A1 | 10/2002 | Seo |
| 2002/0170192 A1 | 11/2002 | Steffey et al. |
| 2002/0176097 A1 | 11/2002 | Rodgers |
| 2003/0002055 A1 | 1/2003 | Kilthau et al. |
| 2003/0033104 A1 | 2/2003 | Gooche |
| 2003/0035100 A1 | 2/2003 | Dimsdale et al. |
| 2003/0043386 A1 | 3/2003 | Froehlich et al. |
| 2003/0053037 A1 | 3/2003 | Blaesing-Bangert et al. |
| 2003/0066954 A1 | 4/2003 | Hipp |
| 2003/0090646 A1 | 5/2003 | Riegl et al. |
| 2003/0125901 A1 | 7/2003 | Steffey et al. |
| 2003/0137449 A1 | 7/2003 | Vashisth et al. |
| 2003/0142631 A1 | 7/2003 | Silvester |
| 2003/0167647 A1 | 9/2003 | Raab et al. |
| 2003/0172536 A1 | 9/2003 | Raab et al. |
| 2003/0172537 A1 | 9/2003 | Raab et al. |
| 2003/0179361 A1 | 9/2003 | Ohtomo et al. |
| 2003/0208919 A1 | 11/2003 | Raab et al. |
| 2003/0221326 A1 | 12/2003 | Raab et al. |
| 2004/0004727 A1 | 1/2004 | Yanagisawa et al. |
| 2004/0022416 A1 | 2/2004 | Lemelson et al. |
| 2004/0027347 A1* | 2/2004 | Farsaie ............ H04N 13/0221 345/419 |
| 2004/0027554 A1 | 2/2004 | Ishinabe et al. |
| 2004/0040166 A1 | 3/2004 | Raab et al. |
| 2004/0103547 A1 | 6/2004 | Raab et al. |
| 2004/0111908 A1 | 6/2004 | Raab et al. |
| 2004/0119020 A1 | 6/2004 | Bodkin |
| 2004/0135990 A1 | 7/2004 | Ohtomo et al. |
| 2004/0139265 A1 | 7/2004 | Hocker, III et al. |
| 2004/0158355 A1 | 8/2004 | Holmqvist et al. |
| 2004/0162700 A1 | 8/2004 | Rosenberg et al. |
| 2004/0179570 A1 | 9/2004 | Vitruk et al. |
| 2004/0221790 A1 | 11/2004 | Sinclair et al. |
| 2004/0246462 A1 | 12/2004 | Kaneko et al. |
| 2004/0246589 A1 | 12/2004 | Kim et al. |
| 2004/0259533 A1 | 12/2004 | Nixon et al. |
| 2005/0016008 A1 | 1/2005 | Raab et al. |
| 2005/0024625 A1 | 2/2005 | Mori et al. |
| 2005/0028393 A1 | 2/2005 | Raab et al. |
| 2005/0046823 A1 | 3/2005 | Ando et al. |
| 2005/0058332 A1 | 3/2005 | Kaufman et al. |
| 2005/0082262 A1 | 4/2005 | Rueb et al. |
| 2005/0085940 A1 | 4/2005 | Griggs et al. |
| 2005/0115092 A1 | 4/2005 | Griggs et al. |
| 2005/0111514 A1 | 5/2005 | Matsumoto et al. |
| 2005/0141052 A1 | 6/2005 | Becker et al. |
| 2005/0144799 A1 | 7/2005 | Raab et al. |
| 2005/0150123 A1 | 7/2005 | Eaton |
| 2005/0151963 A1 | 7/2005 | Pulla et al. |
| 2005/0166413 A1 | 8/2005 | Crampton |
| 2005/0172503 A1 | 8/2005 | Kumagai et al. |
| 2005/0188557 A1 | 9/2005 | Raab et al. |
| 2005/0190384 A1 | 9/2005 | Persi et al. |
| 2005/0259271 A1 | 11/2005 | Christoph |
| 2005/0276466 A1 | 12/2005 | Vaccaro et al. |
| 2005/0283989 A1 | 12/2005 | Pettersson |
| 2006/0016086 A1 | 1/2006 | Raab et al. |
| 2006/0017720 A1 | 1/2006 | Li |
| 2006/0026851 A1 | 2/2006 | Raab et al. |
| 2006/0028203 A1 | 2/2006 | Kawashima et al. |
| 2006/0053647 A1 | 3/2006 | Raab et al. |
| 2006/0056459 A1 | 3/2006 | Stratton et al. |
| 2006/0056559 A1 | 3/2006 | Pleasant et al. |
| 2006/0059270 A1 | 3/2006 | Pleasant et al. |
| 2006/0061566 A1 | 3/2006 | Verma et al. |
| 2006/0066836 A1 | 3/2006 | Bridges et al. |
| 2006/0088044 A1 | 4/2006 | Hammerl et al. |
| 2006/0096108 A1 | 5/2006 | Raab et al. |
| 2006/0103853 A1 | 5/2006 | Palmateer |
| 2006/0109536 A1 | 5/2006 | Mettenleiter et al. |
| 2006/0110026 A1* | 5/2006 | Strassenburg-Kleciak ................ G01C 15/00 382/154 |
| 2006/0123649 A1 | 6/2006 | Muller |
| 2006/0129349 A1 | 6/2006 | Raab et al. |
| 2006/0132803 A1 | 6/2006 | Clair et al. |
| 2006/0145703 A1 | 7/2006 | Steinbichler et al. |
| 2006/0169050 A1 | 8/2006 | Kobayashi et al. |
| 2006/0169608 A1 | 8/2006 | Carnevali et al. |
| 2006/0170870 A1 | 8/2006 | Kaufman et al. |
| 2006/0182314 A1 | 8/2006 | England et al. |
| 2006/0186301 A1 | 8/2006 | Dozier et al. |
| 2006/0193521 A1 | 8/2006 | England, III et al. |
| 2006/0241791 A1 | 10/2006 | Pokorny et al. |
| 2006/0244746 A1 | 11/2006 | England et al. |
| 2006/0245717 A1 | 11/2006 | Ossig et al. |
| 2006/0279246 A1 | 12/2006 | Hashimoto et al. |
| 2006/0282574 A1 | 12/2006 | Zotov et al. |
| 2006/0287769 A1 | 12/2006 | Yanagita et al. |
| 2006/0291970 A1 | 12/2006 | Granger |
| 2007/0019212 A1 | 1/2007 | Gatsios et al. |
| 2007/0024620 A1 | 2/2007 | Muller-Fischer et al. |
| 2007/0030841 A1 | 2/2007 | Lee et al. |
| 2007/0043526 A1 | 2/2007 | De Jonge et al. |
| 2007/0050774 A1 | 3/2007 | Eldson et al. |

(56) References Cited

U.S. PATENT DOCUMENTS

| | | |
|---|---|---|
| 2007/0055806 A1 | 3/2007 | Stratton et al. |
| 2007/0058154 A1 | 3/2007 | Reichert et al. |
| 2007/0058162 A1 | 3/2007 | Romerl, Sr. |
| 2007/0064976 A1 | 3/2007 | England, III |
| 2007/0097381 A1 | 5/2007 | Tobiason et al. |
| 2007/0097382 A1 | 5/2007 | Granger |
| 2007/0100498 A1 | 5/2007 | Matsumoto et al. |
| 2007/0105238 A1 | 5/2007 | Mandl et al. |
| 2007/0118269 A1 | 5/2007 | Gibson et al. |
| 2007/0122250 A1 | 5/2007 | Mullner |
| 2007/0142970 A1 | 6/2007 | Burbank et al. |
| 2007/0147265 A1 | 6/2007 | Eidson et al. |
| 2007/0147435 A1 | 6/2007 | Hamilton et al. |
| 2007/0147562 A1 | 6/2007 | Eidson |
| 2007/0150111 A1 | 6/2007 | Wu et al. |
| 2007/0151390 A1 | 7/2007 | Blumenkranz et al. |
| 2007/0153297 A1 | 7/2007 | Lau |
| 2007/0163134 A1 | 7/2007 | Eaton |
| 2007/0163136 A1 | 7/2007 | Eaton et al. |
| 2007/0171220 A1 | 7/2007 | Kriveshko |
| 2007/0171394 A1 | 7/2007 | Steiner et al. |
| 2007/0172112 A1 | 7/2007 | Paley et al. |
| 2007/0176648 A1 | 8/2007 | Baer |
| 2007/0177016 A1 | 8/2007 | Wu |
| 2007/0181685 A1 | 8/2007 | Zhu et al. |
| 2007/0183459 A1 | 8/2007 | Eidson |
| 2007/0185682 A1 | 8/2007 | Eidson |
| 2007/0217169 A1 | 9/2007 | Yeap et al. |
| 2007/0217170 A1 | 9/2007 | Yeap et al. |
| 2007/0221522 A1 | 9/2007 | Yamada et al. |
| 2007/0223477 A1 | 9/2007 | Eidson |
| 2007/0229801 A1 | 10/2007 | Tearney et al. |
| 2007/0229929 A1 | 10/2007 | Soreide et al. |
| 2007/0247615 A1 | 10/2007 | Bridges et al. |
| 2007/0248122 A1 | 10/2007 | Hamilton |
| 2007/0256311 A1 | 11/2007 | Ferrari |
| 2007/0257660 A1 | 11/2007 | Pleasant et al. |
| 2007/0258378 A1 | 11/2007 | Hamilton |
| 2007/0282564 A1 | 12/2007 | Sprague et al. |
| 2007/0294045 A1 | 12/2007 | Atwell et al. |
| 2008/0046221 A1 | 2/2008 | Stathis |
| 2008/0052808 A1 | 3/2008 | Leick et al. |
| 2008/0052936 A1 | 3/2008 | Briggs et al. |
| 2008/0066583 A1 | 3/2008 | Lott et al. |
| 2008/0068103 A1 | 3/2008 | Cutler |
| 2008/0075325 A1 | 3/2008 | Otani et al. |
| 2008/0075326 A1 | 3/2008 | Otani et al. |
| 2008/0080562 A1 | 4/2008 | Burch et al. |
| 2008/0096108 A1 | 4/2008 | Sumiyama et al. |
| 2008/0098272 A1 | 4/2008 | Fairbanks et al. |
| 2008/0148585 A1 | 6/2008 | Raab et al. |
| 2008/0154538 A1 | 6/2008 | Stathis |
| 2008/0183065 A1 | 7/2008 | Goldbach |
| 2008/0196260 A1 | 8/2008 | Pettersson |
| 2008/0204699 A1 | 8/2008 | Benz et al. |
| 2008/0216552 A1 | 9/2008 | Ibach et al. |
| 2008/0218728 A1 | 9/2008 | Kirschner |
| 2008/0228331 A1 | 9/2008 | McNerney et al. |
| 2008/0232269 A1 | 9/2008 | Tatman et al. |
| 2008/0235969 A1 | 10/2008 | Jordil et al. |
| 2008/0235970 A1 | 10/2008 | Crampton |
| 2008/0240321 A1 | 10/2008 | Narus et al. |
| 2008/0245452 A1 | 10/2008 | Law et al. |
| 2008/0246943 A1 | 10/2008 | Kaufman et al. |
| 2008/0252671 A1 | 10/2008 | Cannell et al. |
| 2008/0256814 A1 | 10/2008 | Pettersson |
| 2008/0257023 A1 | 10/2008 | Jordil et al. |
| 2008/0263411 A1 | 10/2008 | Baney et al. |
| 2008/0271332 A1 | 11/2008 | Jordil et al. |
| 2008/0273758 A1 | 11/2008 | Fuchs et al. |
| 2008/0282564 A1 | 11/2008 | Pettersson |
| 2008/0179206 A1 | 12/2008 | Feinstein et al. |
| 2008/0295349 A1 | 12/2008 | Uhl et al. |
| 2008/0298254 A1 | 12/2008 | Eidson |
| 2008/0302200 A1 | 12/2008 | Tobey |
| 2008/0309460 A1 | 12/2008 | Jefferson et al. |
| 2008/0309546 A1 | 12/2008 | Wakayama et al. |
| 2009/0000136 A1 | 1/2009 | Crampton |
| 2009/0010740 A1 | 1/2009 | Ferrari et al. |
| 2009/0013548 A1 | 1/2009 | Ferrari |
| 2009/0016475 A1 | 1/2009 | Rischar et al. |
| 2009/0021351 A1 | 1/2009 | Beniyama et al. |
| 2009/0031575 A1 | 2/2009 | Tomelleri |
| 2009/0046140 A1 | 2/2009 | Lashmet et al. |
| 2009/0046752 A1 | 2/2009 | Bueche et al. |
| 2009/0046895 A1 | 2/2009 | Pettersson et al. |
| 2009/0049704 A1 | 2/2009 | Styles et al. |
| 2009/0051938 A1 | 2/2009 | Miousset et al. |
| 2009/0083985 A1 | 4/2009 | Ferrari |
| 2009/0089004 A1 | 4/2009 | Vook et al. |
| 2009/0089078 A1 | 4/2009 | Bursey |
| 2009/0089233 A1 | 4/2009 | Gach et al. |
| 2009/0089623 A1 | 4/2009 | Neering et al. |
| 2009/0095047 A1 | 4/2009 | Patel et al. |
| 2009/0100949 A1 | 4/2009 | Shirai et al. |
| 2009/0109797 A1 | 4/2009 | Eidson |
| 2009/0113183 A1 | 4/2009 | Barford et al. |
| 2009/0113229 A1 | 4/2009 | Cataldo et al. |
| 2009/0122805 A1 | 5/2009 | Epps et al. |
| 2009/0125196 A1 | 5/2009 | Velazquez et al. |
| 2009/0133276 A1 | 5/2009 | Bailey et al. |
| 2009/0133494 A1 | 5/2009 | Van Dam et al. |
| 2009/0139105 A1 | 6/2009 | Granger |
| 2009/0157419 A1 | 6/2009 | Bursey |
| 2009/0161091 A1 | 6/2009 | Yamamoto |
| 2009/0165317 A1 | 7/2009 | Little |
| 2009/0177435 A1 | 7/2009 | Heininen |
| 2009/0177438 A1 | 7/2009 | Raab |
| 2009/0185741 A1 | 7/2009 | Nahari et al. |
| 2009/0187373 A1 | 7/2009 | Atwell |
| 2009/0241360 A1 | 10/2009 | Tait et al. |
| 2009/0249634 A1 | 10/2009 | Pettersson |
| 2009/0265946 A1 | 10/2009 | Jordil et al. |
| 2009/0273771 A1 | 11/2009 | Gittinger |
| 2009/0299689 A1 | 12/2009 | Stubben et al. |
| 2009/0322859 A1 | 12/2009 | Shelton et al. |
| 2009/0323121 A1 | 12/2009 | Valkenburg et al. |
| 2009/0323742 A1 | 12/2009 | Kumano |
| 2010/0030421 A1 | 2/2010 | Yoshimura et al. |
| 2010/0040742 A1 | 2/2010 | Dijkhuis et al. |
| 2010/0049891 A1 | 2/2010 | Hartwich et al. |
| 2010/0057392 A1 | 3/2010 | York |
| 2010/0078866 A1 | 4/2010 | Pettersson |
| 2010/0095542 A1 | 4/2010 | Ferrari |
| 2010/0122920 A1 | 5/2010 | Butter et al. |
| 2010/0123892 A1 | 5/2010 | Miller et al. |
| 2010/0134596 A1 | 6/2010 | Becker |
| 2010/0134598 A1 | 6/2010 | St-Pierre et al. |
| 2010/0134599 A1 | 6/2010 | Billert et al. |
| 2010/0135534 A1 | 6/2010 | Weston et al. |
| 2010/0148013 A1 | 6/2010 | Bhotika et al. |
| 2010/0195086 A1 | 8/2010 | Ossig et al. |
| 2010/0207938 A1 | 8/2010 | Yau et al. |
| 2010/0208062 A1 | 8/2010 | Pettersson |
| 2010/0208318 A1 | 8/2010 | Jensen et al. |
| 2010/0245851 A1 | 9/2010 | Teodorescu |
| 2010/0277747 A1 | 11/2010 | Rueb et al. |
| 2010/0281705 A1 | 11/2010 | Verdi et al. |
| 2010/0286941 A1 | 11/2010 | Merlot |
| 2010/0312524 A1 | 12/2010 | Siercks et al. |
| 2010/0318319 A1 | 12/2010 | Maierhofer |
| 2010/0321152 A1 | 12/2010 | Argudyaev et al. |
| 2010/0325907 A1 | 12/2010 | Tait |
| 2011/0000095 A1 | 1/2011 | Carlson |
| 2011/0001958 A1 | 1/2011 | Bridges et al. |
| 2011/0007305 A1 | 1/2011 | Bridges et al. |
| 2011/0007326 A1 | 1/2011 | Daxauer et al. |
| 2011/0013199 A1 | 1/2011 | Siercks et al. |
| 2011/0019155 A1 | 1/2011 | Daniel et al. |
| 2011/0023578 A1 | 2/2011 | Grasser |
| 2011/0025905 A1 | 2/2011 | Tanaka |
| 2011/0043515 A1 | 2/2011 | Stathis |
| 2011/0066781 A1 | 3/2011 | Debelak et al. |
| 2011/0094908 A1 | 4/2011 | Trieu et al. |

(56) References Cited

U.S. PATENT DOCUMENTS

| | | |
|---|---|---|
| 2011/0097014 A1 | 4/2011 | Lin |
| 2011/0107611 A1 | 5/2011 | Desforges et al. |
| 2011/0107612 A1 | 5/2011 | Ferrari et al. |
| 2011/0107614 A1 | 5/2011 | Champ |
| 2011/0111849 A1 | 5/2011 | Sprague et al. |
| 2011/0112786 A1 | 5/2011 | Desforges et al. |
| 2011/0119025 A1 | 5/2011 | Fetter et al. |
| 2011/0123097 A1 | 5/2011 | Van Coppenolle et al. |
| 2011/0164114 A1 | 7/2011 | Kobayashi et al. |
| 2011/0166824 A1 | 7/2011 | Haisty et al. |
| 2011/0173823 A1 | 7/2011 | Bailey et al. |
| 2011/0173827 A1 | 7/2011 | Bailey et al. |
| 2011/0173828 A1 | 7/2011 | York |
| 2011/0178755 A1 | 7/2011 | York |
| 2011/0178758 A1 | 7/2011 | Atwell et al. |
| 2011/0178762 A1 | 7/2011 | York |
| 2011/0178764 A1 | 7/2011 | York |
| 2011/0178765 A1 | 7/2011 | Atwell et al. |
| 2011/0188739 A1 | 8/2011 | Lee et al. |
| 2011/0192043 A1 | 8/2011 | Ferrari et al. |
| 2011/0273568 A1 | 11/2011 | Lagassey et al. |
| 2011/0282622 A1 | 11/2011 | Canter et al. |
| 2011/0288684 A1 | 11/2011 | Farlow et al. |
| 2012/0019806 A1 | 1/2012 | Becker et al. |
| 2012/0033069 A1 | 2/2012 | Becker et al. |
| 2012/0035788 A1 | 2/2012 | Trepagnier et al. |
| 2012/0044476 A1 | 2/2012 | Earhart et al. |
| 2012/0046820 A1 | 2/2012 | Allard et al. |
| 2012/0069325 A1 | 3/2012 | Schumann et al. |
| 2012/0069352 A1 | 3/2012 | Ossig et al. |
| 2012/0070077 A1 | 3/2012 | Ossig et al. |
| 2012/0113913 A1 | 5/2012 | Tiirola et al. |
| 2012/0133953 A1 | 5/2012 | Ossig et al. |
| 2012/0140083 A1 | 6/2012 | Schultz et al. |
| 2012/0140244 A1 | 6/2012 | Gittinger et al. |
| 2012/0154786 A1 | 6/2012 | Gosch et al. |
| 2012/0155744 A1 | 6/2012 | Kennedy et al. |
| 2012/0169876 A1 | 7/2012 | Reichert et al. |
| 2012/0181194 A1 | 7/2012 | McEwan et al. |
| 2012/0197439 A1 | 8/2012 | Wang et al. |
| 2012/0210678 A1 | 8/2012 | Alcouloumre et al. |
| 2012/0217357 A1 | 8/2012 | Franke |
| 2012/0229788 A1 | 9/2012 | Schumann et al. |
| 2012/0260512 A1 | 10/2012 | Kretschmer et al. |
| 2012/0260611 A1 | 10/2012 | Jones et al. |
| 2012/0262700 A1 | 10/2012 | Schumann et al. |
| 2012/0287265 A1 | 11/2012 | Schumann et al. |
| 2013/0010307 A1 | 1/2013 | Greiner et al. |
| 2013/0025143 A1 | 1/2013 | Bailey et al. |
| 2013/0025144 A1 | 1/2013 | Briggs et al. |
| 2013/0027515 A1 | 1/2013 | Vintner et al. |
| 2013/0062243 A1 | 3/2013 | Chang et al. |
| 2013/0070250 A1 | 3/2013 | Ditte et al. |
| 2013/0094024 A1 | 4/2013 | Ruhland et al. |
| 2013/0097882 A1 | 4/2013 | Bridges et al. |
| 2013/0125408 A1 | 5/2013 | Atwell et al. |
| 2013/0162472 A1 | 6/2013 | Najim et al. |
| 2013/0176453 A1 | 7/2013 | Mate et al. |
| 2013/0201487 A1 | 8/2013 | Ossig et al. |
| 2013/0205606 A1 | 8/2013 | Briggs et al. |
| 2013/0212889 A9 | 8/2013 | Bridges et al. |
| 2013/0218024 A1 | 8/2013 | Boctor et al. |
| 2013/0222816 A1 | 8/2013 | Briggs et al. |
| 2013/0300740 A1 | 11/2013 | Snyder et al. |
| 2014/0002608 A1 | 1/2014 | Atwell et al. |
| 2014/0015963 A1 | 1/2014 | Klaas |
| 2014/0028805 A1 | 1/2014 | Tohme |
| 2014/0049784 A1 | 2/2014 | Woloschyn |
| 2014/0063489 A1 | 3/2014 | Steffey et al. |
| 2014/0078519 A1 | 3/2014 | Steffey et al. |
| 2014/0120493 A1 | 5/2014 | Levin |
| 2014/0168370 A1 | 6/2014 | Heidemann et al. |
| 2014/0240690 A1 | 8/2014 | Newman et al. |
| 2014/0267623 A1 | 9/2014 | Bridges et al. |
| 2014/0268108 A1 | 9/2014 | Grau |
| 2014/0300906 A1 | 10/2014 | Becker et al. |
| 2014/0362424 A1 | 12/2014 | Bridges et al. |
| 2015/0015701 A1 | 1/2015 | Yu |
| 2015/0029516 A1 | 1/2015 | Neundorf |
| 2015/0085068 A1 | 3/2015 | Becker et al. |
| 2015/0085301 A1 | 3/2015 | Becker et al. |
| 2015/0109419 A1 | 4/2015 | Vollrath et al. |
| 2015/0160342 A1 | 6/2015 | Zweigle et al. |
| 2015/0160347 A1 | 6/2015 | Zweigle et al. |
| 2015/0160348 A1 | 6/2015 | Zweigle |
| 2015/0226840 A1 | 8/2015 | Becker et al. |
| 2015/0229907 A1 | 8/2015 | Bridges |
| 2015/0241204 A1 | 8/2015 | Steffey et al. |
| 2015/0369917 A1 | 12/2015 | Bridges et al. |
| 2015/0373321 A1 | 12/2015 | Bridges |
| 2015/0378023 A1 | 12/2015 | Royo Royo et al. |
| 2016/0033643 A1 | 2/2016 | Zweigle et al. |
| 2016/0047914 A1 | 2/2016 | Zweigle et al. |
| 2016/0069670 A1 | 3/2016 | Ruhland et al. |
| 2016/0073085 A1 | 3/2016 | Hillebrand et al. |
| 2016/0073091 A1 | 3/2016 | Hillebrand et al. |
| 2016/0073104 A1 | 3/2016 | Hillebrand et al. |

FOREIGN PATENT DOCUMENTS

| | | |
|---|---|---|
| AU | 2005200937 A1 | 9/2006 |
| CN | 2236119 Y | 9/1996 |
| CN | 1133969 A | 10/1996 |
| CN | 1307241 A | 8/2001 |
| CN | 2508896 Y | 9/2002 |
| CN | 2665668 Y | 12/2004 |
| CN | 1630804 A | 6/2005 |
| CN | 1630805 A | 6/2005 |
| CN | 1688867 A | 10/2005 |
| CN | 1735789 | 2/2006 |
| CN | 1812868 A | 8/2006 |
| CN | 1818537 A | 8/2006 |
| CN | 1838102 A | 9/2006 |
| CN | 1839293 A | 9/2006 |
| CN | 1853084 A | 10/2006 |
| CN | 1926400 A | 3/2007 |
| CN | 101024286 A | 8/2007 |
| CN | 101156043 A | 4/2008 |
| CN | 101163939 A | 4/2008 |
| CN | 101371099 A | 2/2009 |
| CN | 101416024 A | 4/2009 |
| CN | 101484828 A | 7/2009 |
| CN | 201266071 Y | 7/2009 |
| CN | 101506684 A | 8/2009 |
| CN | 101511529 A | 8/2009 |
| DE | 2216765 A1 | 4/1972 |
| DE | 2950138 A1 | 6/1981 |
| DE | 3227980 A1 | 5/1983 |
| DE | 3245060 A1 | 7/1983 |
| DE | 3340317 A1 | 8/1984 |
| DE | 4027990 C1 | 2/1992 |
| DE | 4222642 A1 | 1/1994 |
| DE | 4340756 A1 | 6/1994 |
| DE | 4303804 A1 | 8/1994 |
| DE | 4445464 A1 | 7/1995 |
| DE | 4410775 A1 | 10/1995 |
| DE | 4412044 A1 | 10/1995 |
| DE | 29622033 | 2/1997 |
| DE | 19543763 A1 | 5/1997 |
| DE | 19601875 A1 | 7/1997 |
| DE | 19607345 A1 | 8/1997 |
| DE | 19720049 A1 | 11/1998 |
| DE | 19811550 A1 | 9/1999 |
| DE | 19820307 A1 | 11/1999 |
| DE | 19850118 A1 | 5/2000 |
| DE | 19928958 A1 | 11/2000 |
| DE | 10114126 A1 | 10/2001 |
| DE | 10026357 A1 | 1/2002 |
| DE | 20208077 U1 | 5/2002 |
| DE | 10137241 A1 | 9/2002 |
| DE | 10149750 A1 | 9/2002 |
| DE | 10155488 A1 | 5/2003 |
| DE | 10219054 A1 | 11/2003 |
| DE | 10232028 A1 | 2/2004 |

(56) References Cited

FOREIGN PATENT DOCUMENTS

| | | |
|---|---|---|
| DE | 10336458 A1 | 2/2004 |
| DE | 10244643 A1 | 4/2004 |
| DE | 20320216 U1 | 4/2004 |
| DE | 10304188 A1 | 8/2004 |
| DE | 10313223 A1 | 10/2004 |
| DE | 10326848 A1 | 1/2005 |
| DE | 202005000983 U1 | 3/2005 |
| DE | 10361870 A1 | 7/2005 |
| DE | 102004015668 B3 | 9/2005 |
| DE | 102004015111 A1 | 10/2005 |
| DE | 102004028090 A1 | 12/2005 |
| DE | 202006005643 U1 | 8/2006 |
| DE | 102004010083 B4 | 11/2006 |
| DE | 102005043931 A1 | 3/2007 |
| DE | 102005056265 A1 | 5/2007 |
| DE | 102006053611 A1 | 5/2007 |
| DE | 102005060967 A1 | 6/2007 |
| DE | 102006023902 A1 | 11/2007 |
| DE | 102006024534 A1 | 11/2007 |
| DE | 102006035292 A1 | 1/2008 |
| DE | 202006020299 U1 | 5/2008 |
| DE | 102007037162 A1 | 2/2009 |
| DE | 102008014274 A1 | 8/2009 |
| DE | 102008039838 A1 | 3/2010 |
| DE | 102005036929 B4 | 6/2010 |
| DE | 102008062763 B3 | 7/2010 |
| DE | 102009001894 A1 | 9/2010 |
| DE | 102009035336 B3 | 11/2010 |
| DE | 102009055988 B3 | 3/2011 |
| DE | 202010005042 U1 | 8/2011 |
| DE | 102010032723 B3 | 11/2011 |
| DE | 102010032726 B3 | 11/2011 |
| DE | 102010033561 B3 | 12/2011 |
| DE | 102010032725 A1 | 1/2012 |
| DE | 202011051975 U1 | 2/2013 |
| DE | 102012107544 B3 | 5/2013 |
| DE | 102012109481 A1 | 4/2014 |
| DE | 102012112322 A1 | 6/2014 |
| EP | 0546784 A2 | 6/1993 |
| EP | 0667549 A2 | 8/1995 |
| EP | 0727642 A1 | 8/1996 |
| EP | 0730210 A1 | 9/1996 |
| EP | 0614517 A1 | 3/1997 |
| EP | 0838696 A1 | 4/1998 |
| EP | 0949524 A1 | 10/1999 |
| EP | 1160539 A1 | 12/2001 |
| EP | 1189124 A1 | 3/2002 |
| EP | 0767357 B1 | 5/2002 |
| EP | 1310764 A2 | 5/2003 |
| EP | 1342989 A2 | 9/2003 |
| EP | 1347267 A1 | 9/2003 |
| EP | 1361414 A1 | 11/2003 |
| EP | 1452279 A1 | 9/2004 |
| EP | 1468791 A1 | 10/2004 |
| EP | 1056987 B1 | 4/2005 |
| EP | 1528410 A1 | 5/2005 |
| EP | 1669713 A1 | 6/2006 |
| EP | 1734425 | 12/2006 |
| EP | 1429109 A2 | 4/2007 |
| EP | 1429109 B1 | 4/2007 |
| EP | 1764579 | 12/2007 |
| EP | 1878543 A2 | 1/2008 |
| EP | 1882895 A1 | 1/2008 |
| EP | 1967930 A2 | 9/2008 |
| EP | 2003419 A1 | 12/2008 |
| EP | 2023077 A1 | 2/2009 |
| EP | 2042905 A1 | 4/2009 |
| EP | 2060530 A1 | 5/2009 |
| EP | 2068067 A1 | 6/2009 |
| EP | 2068114 | 6/2009 |
| EP | 2108917 A1 | 10/2009 |
| EP | 2177868 A2 | 4/2010 |
| EP | 2259013 A1 | 12/2010 |
| EP | 2400261 A1 | 12/2011 |
| EP | 2428764 A1 | 3/2012 |
| EP | 2693300 A2 | 2/2014 |
| EP | 2728306 A1 | 5/2014 |
| FR | 2603228 A1 | 3/1988 |
| FR | 2935043 A1 | 2/2010 |
| GB | 894320 | 4/1962 |
| GB | 1112941 | 5/1968 |
| GB | 2222695 A | 3/1990 |
| GB | 2255648 A | 11/1992 |
| GB | 2336493 A | 10/1999 |
| GB | 2341203 A | 3/2000 |
| GB | 2388661 A | 11/2003 |
| GB | 2420241 A | 5/2006 |
| GB | 2447258 A | 9/2008 |
| GB | 2452033 A | 2/2009 |
| GB | 2452033 A | 2/2009 |
| JE | 07128051 A | 5/1995 |
| JP | 5581525 | 6/1955 |
| JP | 575584 A | 1/1982 |
| JP | 58171291 A | 1/1983 |
| JP | 5827264 | 2/1983 |
| JP | S58171291 A | 10/1983 |
| JP | 59133890 A | 8/1984 |
| JP | 61062885 A | 3/1986 |
| JP | S61157095 A | 7/1986 |
| JP | 63135814 A | 6/1988 |
| JP | 0357911 A | 3/1991 |
| JP | 04115108 A | 4/1992 |
| JP | 04225188 A1 | 8/1992 |
| JP | 04267214 A | 9/1992 |
| JP | 0572477 A | 3/1993 |
| JP | 06313710 A | 11/1994 |
| JP | 1994313710 A | 11/1994 |
| JP | 06331733 | 12/1994 |
| JP | 06341838 | 12/1994 |
| JP | 074950 A | 1/1995 |
| JP | 07128051 A | 5/1995 |
| JP | 7210586 A | 8/1995 |
| JP | 07229963 A | 8/1995 |
| JP | 0815413 A | 1/1996 |
| JP | 0821714 A | 1/1996 |
| JP | 08129145 A | 5/1996 |
| JP | H08136849 A | 5/1996 |
| JP | 08262140 A | 10/1996 |
| JP | 0921868 A | 1/1997 |
| JP | 10213661 A | 8/1998 |
| JP | 1123993 A | 1/1999 |
| JP | H11083530 | 3/1999 |
| JP | 2001056275 | 8/1999 |
| JP | 2000121724 A | 4/2000 |
| JP | 2000249546 A | 9/2000 |
| JP | 2000339468 A | 12/2000 |
| JP | 2001013001 A | 1/2001 |
| JP | 2001021303 A | 1/2001 |
| JP | 2001066211 A | 3/2001 |
| JP | 2001337278 A | 12/2001 |
| JP | 2003050128 A | 2/2003 |
| JP | 2003156330 A | 5/2003 |
| JP | 2003156562 A | 5/2003 |
| JP | 2003194526 A | 7/2003 |
| JP | 2003202215 A | 7/2003 |
| JP | 2003216255 A | 7/2003 |
| JP | 2003308205 A | 10/2003 |
| JP | 2004109106 A | 4/2004 |
| JP | 2004245832 A | 9/2004 |
| JP | 2004257927 A | 9/2004 |
| JP | 2004333398 A | 11/2004 |
| JP | 2004348575 A | 12/2004 |
| JP | 2005030937 A | 2/2005 |
| JP | 2005055226 A | 3/2005 |
| JP | 2005069700 A | 3/2005 |
| JP | 2005174887 A | 6/2005 |
| JP | 2005517908 A1 | 6/2005 |
| JP | 2005215917 A | 8/2005 |
| JP | 2005221336 A | 8/2005 |
| JP | 2005257510 A | 9/2005 |
| JP | 2006038683 A | 2/2006 |
| JP | 2006102176 A | 4/2006 |
| JP | 2006203404 A | 8/2006 |
| JP | 2006226948 A | 8/2006 |

(56) References Cited

FOREIGN PATENT DOCUMENTS

| | | |
|---|---|---|
| JP | 2006241833 A | 9/2006 |
| JP | 2006266821 A | 10/2006 |
| JP | 2006301991 A | 11/2006 |
| JP | 2007178943 A | 7/2007 |
| JP | 2008076303 A | 4/2008 |
| JP | 2008082707 A | 4/2008 |
| JP | 2008096123 A | 4/2008 |
| JP | 2008107286 A | 5/2008 |
| JP | 2008304220 A | 12/2008 |
| JP | 2009063339 A | 3/2009 |
| JP | 2009524057 | 6/2009 |
| JP | 2009531674 A | 9/2009 |
| JP | 2009229255 A | 10/2009 |
| JP | 2009541758 A | 11/2009 |
| JP | 2010169405 A | 8/2010 |
| JP | 2012533749 | 12/2012 |
| JP | 2013516928 A | 5/2013 |
| JP | 2013517508 A | 5/2013 |
| JP | 2013117417 A | 6/2013 |
| JP | 2013543970 A | 12/2013 |
| WO | 8801924 A1 | 3/1988 |
| WO | 8905512 A1 | 6/1989 |
| WO | 9208568 A1 | 5/1992 |
| WO | 9711399 | 3/1997 |
| WO | 9808050 A1 | 2/1998 |
| WO | 9910706 A1 | 3/1999 |
| WO | 0014474 | 3/2000 |
| WO | 0020880 A2 | 4/2000 |
| WO | 0026612 A1 | 5/2000 |
| WO | 0033149 A1 | 6/2000 |
| WO | 0034733 A1 | 6/2000 |
| WO | 0063645 A1 | 10/2000 |
| WO | 0063681 A2 | 10/2000 |
| WO | 0177613 A1 | 10/2001 |
| WO | 02084327 A2 | 10/2002 |
| WO | 02088855 A1 | 11/2002 |
| WO | 02101323 A2 | 12/2002 |
| WO | 2004096502 A1 | 11/2004 |
| WO | 2005008271 A2 | 1/2005 |
| WO | 2005059473 A2 | 6/2005 |
| WO | 2005072917 A1 | 8/2005 |
| WO | 2005075875 | 8/2005 |
| WO | 2005100908 A1 | 10/2005 |
| WO | 2005103863 | 11/2005 |
| WO | 2006000552 A1 | 1/2006 |
| WO | 2006014445 A1 | 2/2006 |
| WO | 2006051264 A1 | 5/2006 |
| WO | 2006053837 A1 | 5/2006 |
| WO | 2007002319 A1 | 1/2007 |
| WO | 200712198 A1 | 2/2007 |
| WO | 2007028941 | 3/2007 |
| WO | 2007051972 A1 | 5/2007 |
| WO | 2007087198 A1 | 8/2007 |
| WO | 2007118478 A1 | 10/2007 |
| WO | 2007125081 A1 | 11/2007 |
| WO | 2007144906 A1 | 12/2007 |
| WO | 2008019856 A1 | 2/2008 |
| WO | 2008027588 A2 | 3/2008 |
| WO | 2008047171 A1 | 4/2008 |
| WO | 2008048424 A2 | 4/2008 |
| WO | 2008052348 A1 | 5/2008 |
| WO | 2008064276 A3 | 5/2008 |
| WO | 2008066896 | 6/2008 |
| WO | 2008068791 A1 | 6/2008 |
| WO | 2008075170 A1 | 6/2008 |
| WO | 2008121073 A1 | 10/2008 |
| WO | 2008157061 A1 | 12/2008 |
| WO | 2009001165 A1 | 12/2008 |
| WO | 2009003225 A1 | 1/2009 |
| WO | 2009016185 A1 | 2/2009 |
| WO | 2009053085 A1 | 4/2009 |
| WO | 2009083452 A1 | 7/2009 |
| WO | 2009095384 A2 | 8/2009 |
| WO | 2009123278 A1 | 10/2009 |
| WO | 2009127526 A1 | 10/2009 |
| WO | 2009130169 A1 | 10/2009 |
| WO | 2009149740 A1 | 12/2009 |
| WO | 2010015086 A1 | 2/2010 |
| WO | 2010040742 A1 | 4/2010 |
| WO | 2010092131 A1 | 8/2010 |
| WO | 2010108089 A2 | 9/2010 |
| WO | 2010108644 A1 | 9/2010 |
| WO | 2010148525 A1 | 12/2010 |
| WO | 2011000435 A1 | 1/2011 |
| WO | 2011000955 A1 | 1/2011 |
| WO | 2011021103 A1 | 2/2011 |
| WO | 2011029140 A1 | 3/2011 |
| WO | 2011057130 A2 | 5/2011 |
| WO | 2011060899 A1 | 5/2011 |
| WO | 2011002908 A1 | 6/2011 |
| WO | 2011090829 A2 | 7/2011 |
| WO | 2011090895 A1 | 7/2011 |
| WO | 2012037157 A2 | 3/2012 |
| WO | 2012038446 A1 | 3/2012 |
| WO | 2012061122 A1 | 5/2012 |
| WO | 2012013525 A2 | 8/2012 |
| WO | 2012103525 A2 | 8/2012 |
| WO | 2012112683 A2 | 8/2012 |
| WO | 2012125671 A1 | 9/2012 |
| WO | 2012168322 A2 | 12/2012 |
| WO | 2013112455 A1 | 8/2013 |
| WO | 2013184340 A1 | 12/2013 |
| WO | 2013186160 A1 | 12/2013 |
| WO | 2013188026 A1 | 12/2013 |
| WO | 2013190031 A1 | 12/2013 |
| WO | 2014128498 A2 | 8/2014 |

OTHER PUBLICATIONS

Creaform Metrology Solutions, "Handy Scan 3D—The Truly Portable Metrology-Grade 3D Scanners" brochure, 2014; 7 pages.
Creaform, "Creaform Releases Completely Re-Engineered Handyscan 3D Portable Scanners", May 5, 2014, 1 page.
Davidson, A. et al., "MonoSLAM: Real-Time Single Camera SLAM", IEEE Transactions on Pattern Analysis and Machine Intelligence, vol. 29, No. 6, Jun. 1, 2007, pp. 1052-1067, XP011179664.
Decision Revoking the European Patent (Art. 101(3)(b) EPC) dated Aug. 14, 2013, filed in Opposition re Application No. 07 785 873.6/U.S. Pat. No. 2,062,069, Proprietor: Faro Technologies, Inc., filed by Leica Geosystem AG on Feb. 5, 2013, 12 pages.
Geng, J. "Structured-Light 3D Surface Imaging: A Tutorial," Advances in Optics and Photonics 3; Mar. 31, 2011, pp. 128-160; IEEE Intelligent Transportation System Society; 2011 Optical Society of America.
Geng, J., et al., "DLP-based structured light 3D imaging technologies and applications", Emerging Digitial Micromirror Device Based Systems and Applications III, Spie, vol. 7932, No. 1, Feb. 10, 2011 (Feb. 10, 2011) 15 pgs.
International Preliminary Report on Patentability and Written Opinion of the International Searching Authority; International Application No. PCT/US2013/022186; International Filing Date: Jan. 18, 2013; dated Sep. 4, 2014; 7 pages.
IPRP, Issued Nov. 12, 2014.
IPRP, Mailed Jun. 15, 2017.
Jasiobedzki, Piotr, "Laser Eye—A New 3D Sensor for Active Vision", SPIE—Sensor Fusion VI, vol. 2059, Sep. 7, 1993 (Sep. 7, 1993), pp. 316-321, XP00262856, Boston, U.S.A., Retrieved from the Internet: URL:http://scitation.aip.org/getpdf/servlet/Ge.
Jgeng "DLP-Based Structured Light 3D Imaging Technologies and Applications" (15 pages) Emerging Digital Micromirror Device Based Systems and Application III; edited by Michael R. Douglass, Patrick I. Oden, Proc. of SPIE, vol. 7932, 79320B; (Feb. 9, 20.
Kreon Laser Scanners, Getting the Best in Cutting Edge 3D Digitizing Technology, B3-D MCAD Consulting/Sales [online], [retrieved Nov. 29, 2011], http://www.b3-d.com/Kreon.html.
Langford, et al., "Practical Skills in Forensic Science", Pearson Education Limited, Essex, England, First Published 2005, Forensic Chemistry.

(56) References Cited

OTHER PUBLICATIONS

Laser Reverse Engineering with Microscribe, [online], [retrieved Nov. 29, 2011], http://www.youtube.com/watch?v=8VRz_2aEJ4E&feature=PlayList&p=F63ABF74F30DC81B&playnext=1&playnext_from=PL&index=1.

Lee, Min-Gu, et al., "Compact 3D lidar based on optically coupled horizontal and vertical scanning mechanism for the autonomous navigation of robots," Proceedings of SPIE, vol. 8037, May 10, 2011 (May 10, 2011), p. 80371H, XP055069052.

Leica Geosystems, FBI Crime Scene Case Study.

Leica Geosystems: "Leica Rugby 55 Designed for Interior Built for Construction", Jan. 1, 2009, XP002660558, Retrieved from the Internet: URL:http://www.leica-geosystems.com/downloads123/zz/lasers/Rugby%2055/brochures/Leica_Rugby_55_brochure_en.pdf [re.

Leica TPS800 Performance Series—Equipment List, 2004, pp. 1-4.

Mahdy, Yousef B., et al; "Projector Calibration Using Passive Stereo and Triangulation"; International Journal of Future Computer and Communication; vol. 2; No. 5; 385-390; Oct. 2013; 6 pgs.

May, S. et al, "Robust 3D-Mapping with Time-of-Flight Cameras", Intelligent Robots and Systems, IROS 2009, IEEE/RSJ International Conference on Oct. 10, 2009, pp. 1673-1678, XP031581042.

Merriam-Webster (m-w.com), "Interface". 2012. http://www.merriam-webster.com/dictionary/interface.

Merriam-Webster (m-w.com), "Traverse". 2012. http://www.merriam-webster.com/dictionary/traverse.

MicroScan 3D User Guide, RSI GmbH, 3D Systems & Software, Oberursel, Germany, email: info@rsi-gmbh.de, Copyright RSI Roland Seifert Imaging GmbH 2008.

Moog Components Group "Technical Brief; Fiber Optic Rotary Joints" Document No. 303 (6 pages) Mar. 2008; MOOG, Inc. 2008 Canada; Focal Technologies.

MOOG Components Group; "Fiber Optic Rotary Joints; Product Guide" (4 pages) Dec. 2010; MOOG, Inc. 2010.

Ohno, K. et al., "Real-Time Robot Trajectory Estimation and 3D Map Construction Using 3D Camera", Intelligent Robots and Systems, 2006 IEEE/RSJ International Conference on Oct. 1, 2006, pp. 5279-5285, XP031006974.

P Ben-Tzvi, et al "Extraction of 3D Images Using Pitch-Actuated 2D Laser Range Finder for Robotic Vision" (6 pages) BNSDOCID <XP 31840390A_1_>.

P Ben-Tzvi, et al "Extraction of 3D Images Using Pitch-Actuated 2D Laser Range Finder for Robotic Vision" (6 pages) BNSDOCID <XP 31840390A_1_>, Oct. 15, 2010.

Provision of the minutes in accordance with Rule 124(4) EPC dated Aug. 14, 2013, filed in Opposition re Application No. 07 785 873.6/U.S. Pat. No. 2,062,069, Proprietor: Faro Technologies, Inc., filed by Leica Geosystem AG on Feb. 5, 2013, pp. 1-10.

Romer "Romer Absolute Arm Maximum Performance Portable Measurement" (Printed 2010); Hexagon Metrology, Inc., http://us:Romer.com; 2010.

Romer "Romer Absolute Arm Maximum Performance Portable Measurement" (Printed Oct. 2010); Hexagon Metrology, Inc. htt://us:ROMER.com; Hexagon Metrology, Inc. 2010.

Romer "Romer Absolute Arm Maximum Performance Portable Measurement" (Printed Oct. 2010); Hexagon Metrology, Inc. http://us:ROMER.com; Hexagon Metrology, Inc 2010.

Romer "Romer Absolute Arm Product Brochure" (2010); Hexagon Metrology; www.hexagonmetrology.com; Hexagon AB 2010.

Romer Measuring Arms; Portable CMMs for the shop floor; 20 pages; Hexagon Metrology, Inc. (2009) http//us.ROMER.com.

RW Boyd "Radiometry and the Detection of Otpical Radiation" (pp. 20-23) 1983 Jon wiley & Sons, Inc.

Sauter, et al., Towards New Hybrid Networks for Industrial Automation, IEEE, 2009.

Se, et al., "Instant Scene Modeler for Crime Scene Reconstruction", MDA, Space Missions, Ontario, Canada, Copyright 2005, IEEE; 8 pages.

Search Report dated Feb. 15, 2017.

Surmann et al. "An autonomous mobile robot with a 3D laser range finder for 3D exploration and digitalization of indoor enviornments." Robotics and Autonomous Systems vol. 45 No. 3-4, Dec. 31, 2003, pp. 181-198. Amsterdamn, Netherlands; 18 pgs.

The Scene, Journal of the Association for Crime Scene Reconstruction, Apr.-Jun. 2006, vol. 12, Issue 2; 31 pages.

Trimble—Trimble SPS630, SPS730 and SPS930 Universal Total Stations, [on-line] http://www.trimble.com/sps630_730_930.shtml (1 of 4), [Retreived Jan. 26, 2010 8:50:29AM].

Umeda, K., et al., Registration of Range and Color Images Using Gradient Constraints and Ran Intensity Images, Proceedings of the 17th International Conference onPatern Recognition (ICPR'04), Copyright 2010 IEEE [Retrieved online Jan. 28, 2010—IEEE.

Williams, J.A., et al., Evaluation of a Novel Multiple Point Set Registration Algorithm, Copyright 2000, [Retrieved on Jan. 18, 2010 at 04:10 from IEEE Xplore], pp. 1006-1010.

Willoughby, P., "Elastically Averaged Precisoin Alignment", In: "Doctoral Thesis", Jun. 1, 2005, Massachusetts Institute of Technology, XP55005620, abstract 1.1 Motivation, Chapter 3, Chapter 6.

Ye, C. et al., "Characterization of a 2-D Laser Scanner for Mobile Robot Obstacle Negotiation" Proceedings / 2002 IEEE International Conference on Robotics and Automation, May 11-15, 2002, Washington, D.C., May 1, 2002, pp. 2512-2518, XP009169742.

YK Cho, et al. "Light-weight 3D LADAR System for Construction Robotic Operations" (pp. 237-244); 26th International Symposium on Automation and Robotics in Construction (ISARC 2009).

Brenneke et al: "Using 3D laser range data for slam in outsoor enviomments." Proceedings of the 2003 IEEE/RSJ International Conference on Intelligent Robots and Systems. Las Vegas, NV Oct. 27-31, 2003; IEEE US, vol. 1, Oct. 27, 2003, pp. 188-193.

Gebre, Biruk A., et al., "Remotely Operated and Autonomous Mapping System (ROAMS)", Technologies for Practical Robot Applications, TEPRA 2009, IEEE International Conference on Nov. 9, 2009, pp. 173-178, XP031570394.

Written Opinion of the International Searching Authority for Application No. PCT/EP2011/001662; dated May 26, 2011.

Written Opinion of the International Searching Authority for International Application No. PCT/US2011/021274 dated May 6, 2011.

"Scanner Basis Configuration for Riegl VQ-250", Riegl Company Webpage, Feb. 16, 2011 (Feb. 16, 2011) [retrieved on Apr. 19, 2013 (Apr. 19, 2013)]. Retrieved from the internet; 3 pages.

14th International Forensic Science Symposium, Interpol—Lyon, France, Oct. 19-22, 2004, Review Papers, Edited by Dr. Niamh Nic Daeid, Forensic Science Unit, Univeristy of Strathclyde, Glasgow, UK; 585 pages.

A. Hart; "Kinematic Coupling Interchangeability" Precision Engineering; vol. 28, No. 1; Jan. 1, 2004 (Jan. 1, 2004) pp. 1-15.

ABB Flexible Automation AB: "Product Manual IRB 6400R M99, On-line Manual"; Sep. 13, 2006; XP00002657684; Retrieved from the Internet: URL: http://pergatory.mit.edu/kinematiccouplings/case_studies/ABB_Robotics/general/6400R%20Product%20Manual.pdf (re.

Akca, Devrim, "Full Automated Registration of Laser Scanner Point Clouds", Institute of Geodesy and Photogrammetry, Swiss Federal Institute of Technology, Zuerich, Switzerland; Published Dec. 2003, 8 pages.

Anonymous : So wird's gemacht: Mit T-DSL and Windows XP Home Edition gemeinsam ins Internet (Teil 3) Internet Citation, Jul. 2003 (Jul. 2003), XP002364586, Retrieved from Internet: URL:http://support.microsfot.com/kb/814538/DE/ [retrieved on Jan. 26, 2006].

Bornaz, L., et al., "Multiple Scan Registration in Lidar Close-Range Applications," The International Archives of the Photogrammetry, Remote Sensing and Spatial Information Sciences, vol. XXXIV, Part 5/W12, Jul. 2003 (Jul. 2007), pp. 72-77, XP002590306.

Bouvet, D., et al., "Precise 3-D Localization by Automatic Laser Theodolite and Odometer for Civil-Engineering Machines", Proceedings of the 2001 IEEE International Conference on Robotics and Automation. ICRA 2001. Seoul, Korea, May 21-26, 2001; IEEE, US.

Cho, et al., Implementation of a Precision Time Protocol over Low Rate Wireless Personal Area Networks, IEEE, 2008.

Cooklev, et al., An Implementation of IEEE 1588 Over IEEE 802.11b for Syncrhonization of Wireless Local Area Network Nodes, IEEE Transactions on Instrumentation and Measurement, vol. 56, No. 5, Oct. 2007, 8 pages.

(56) References Cited

OTHER PUBLICATIONS

Dylan, Craig R., High Precision Makes the Massive Bay Bridge Project Work. Suspended in MidAir—Cover Story—Point of Beginning, Jan. 1, 2010, [online] http://www.pobonline.com/Articles/Cover_Story/BNP_GUID_9-5-2006_A_10000000000 . . . [Retreived Jan. 25, 2002.
Electro-Optical Information Systems, "The Handy Handheld Digitizer" [online], [retrieved on Nov. 29, 2011], http://vidibotics_com/htm/handy.htm, 2 pages.
Elstrom, M.D., et al., Stereo-Based Registration of LADAR and Color Imagery, Intelligent Robots and Computer Vision XVII: Algorithms, Techniques, and Active Vision, Boston, MA, USA, vol. 3522, Nov. 2, 1998 (Nov. 2, 1994), Nov. 3, 1998 (Nov. 3, 1998) p. 343-354.
Elstrom, M.D., Stereo-Based Registration of LADAR and Color Imagery, Part of SPIE Conference on Intelligent Robots and Computer Vision XVII: Algorithms, Techniques, and Active Vision, Boston, MA, Nov. 1998, SPIE vol. 3522, 0277-786X/98; [Retrieved on.
EO Edmund Optics "Silicon Detectors" (5 pages) 2013 Edmund Optics, Inc. http://www.edmundoptics.com/electro-optics/detector-components/silicon-detectors/1305[Oct. 15, 2013 10:14:53 AM].
FARO Laser Scanner LS, Recording Reality's Digital Fingerprint, The Measure of Success, Rev. Aug. 22, 2005, 16 pages.
FARO Laserscanner LS, Presentation Forensic Package, Policeschool of Hessen, Wiesbaden, Germany, Dec. 14, 2005; FARO Technologies, Copyright 2008, 17 pages.
FARO Product Catalog; Faro Arm; 68 pages; Faro Technologies Inc. 2009; printed Aug. 3, 2009.
Franklin, Paul F., What IEEE 1588 Means for Your Next T&M System Design, Keithley Instruments, Inc., [on-line] Oct. 19, 2010, http://www.eetimes.com/General/DisplayPrintViewContent?contentItemId=4209746, [Retreived Oct. 21, 2010], 6 pages.
GHOST 3D Systems, Authorized MicroScribe Solutions, FAQs—MicroScribe 3D Laser, MicroScan Tools, & related info, [online], [retrieved Nov. 29, 2011], http://microscribe.ghost3d.com/gt_microscan-3d_faqs.htm,. 4 pages.
Godin, G., et al., A Method for the Registration of Attributed Range Images, Copyright 2001, [Retrieved on Jan. 18, 2010 at 03:29 from IEEE Xplore]. p. 178-186.
GoMeasure3D—Your source for all things measurement, Baces 3D 100 Series Portable CMM from GoMeasure3D, [online], [retrieved Nov. 29, 2011], http://www.gomeasure3d.com/baces100.html, 3 pages.
Haag, et al., "Technical Overview and Application of 3D Laser Scanning for Shooting Reconstruction and Crime Scene nvestigations", Presented at the American Academy of Forensic Sciences Scientific Meeting, Washington, D.C., Feb. 21, 2008; 71 pages.
Hart, A., "Kinematic Coupling Interchangeability", Precision Engineering, vol. 28, No. 1, Jan. 1, 2004, pp. 1-15, XP55005507, ISSN: 0141-6359, DOI: 10.1016/S0141-6359(03)00071-0.
Horn, B.K.P., "Closed-Form Solution of Absolute Orientation Using Unit Quatemions" J. Opt. Soc. Am. A., vol. 4., No. 4, Apr. 1987, pp. 629-642, ISSN 0740-3232.
Howard, et al., "Virtual Environments for Scene of Crime Reconstruction and Analysis", Advanced Interfaces Group, Department of Computer Science, University of Manchester, Manchester, UK, Feb. 28, 2000.
Huebner, S.F., "Sniper Shooting Tecnhique", "Scharfschutzen Schiebtechnik", Copyright by C.A. Civil Arms Verlag GmbH, Lichtenwald 1989, Alle Rechte vorbehalten, pp. 11-17.
HYDROpro Navigation, Hydropgraphic Survey Software, Trimble, www.trimble.com, Copyright 1997-2003.
Information on Electro-Optical Information Systems; EOIS 3D Mini-Moire C.M.M. Sensor for Non-Contact Measuring & Surface Mapping; Direct Dimensions, Jun. 1995.
Ingensand, H., Dr., "Introduction to Geodetic Metrology", "Einfuhrung in die Geodatische Messtechnik", Federal Institute of Technology Zurich, 2004, with English translation, 6 pages.
Qsun Laserscanner Brochure, 2 Pages, Apr. 2005.
It is Alive in the Lab, Autodesk University, Fun with the Immersion MicroScribe Laser Scanner, [online], [retrieved Nov. 29, 2011], http://labs.blogs.com/its_alive_in_the_lab/2007/11/fun-with-the-im.html; 3 pages.
Jasperneite J et al: "Enhancements to the time synchronization standard IEEE-1588 for a system of cascaded bridges", Factory Communication Systems, 2004. Proceedings. 2004 IEEE Internatio nal Workshop on Vienna, Austria Sep. 22-24, 2004, Piscataway, NJ, USA,IEEE, Sep. 22, 2004 (Sep. 22, 2004), Seiten 239-244, XP010756406, DOI: 10.1109/WFCS.2004.1377716 ISBN: 978-0-7803-8734-8.
Leica Geosystems TruStory Forensic Analysis by Albuquerque Police Department, 2006.
Leica Geosystems, FBI Crime Scene Case Study, Tony Grissim, Feb. 2006; 11 pages.
Leica Geosystems, TruStory Forensic Analysis by Albuquerque Police Department, 2006, 2 pages.
Leica Rugby 55 Designed for Interior Built for Construction Brochure, Leica Geosystems, Heerbrugg, Switzerland, www.leica-geosystems.com.
Merriam-Webster (m-w.com), "Parts". 2012, pp. 1-6. http://www.merriam-webster.com/dictionary/parts.
Patrick Willoughby; "Elastically Averaged Precision Alignment"; In: "Doctoral Thesis" ; Jun. 1, 2005; Massachusetts Institute of Technology; XP55005620; Abstract 1.1 Motivation; Chapter 3, Chapter 6.
PCT International Search Report and Written Opinion for International Application No. PCT/US2013/040321 dated Jul. 15, 2013; 11 pages.
Romer "Romer Measuring Arms Portable CMMs for R&D and shop floor" (Mar. 2009) Hexagon Metrology (16 pages).
Spada, et al., IEEE 1588 Lowers Integration Costs in Continuous Flow Automated Production Lines, XP-002498255, ARC Insights, Insight # 2003-33MD&H, Aug. 20, 2003.
Harrison A. et al., "High Quality 3D Laser Ranging Under General Vehicle Motion", 2008 IEEE International Conference on Robotics and Automation, May 19-23, 2008, pp. 7-12, XP031340123.
International Search Report and Written Opinion for Application No. PCT/US2014/069180 dated Jul. 14, 2015; 13 pages.
Surmann, H. et al., "An Autonomous Mobile Robot with a 3D Laser Range Finder for 3D Exploration and Digitalization of Indoor Environments", Robotics and Autonomous Systems, Elsevier Science Publishers, vol. 45, No. 3-4, Dec. 31, 2003, pp. 181-198.
Yan, R., et al, "3D Point Cloud Map Construction Based on Line Segments with Two Mutually Perpendicular Laser Sensors", 2013 13th International Conference on Control, Automation and Systems (ICCAS 2013), IEEE, Oct. 20, 2013, pp. 1114-1116.
Japanese Office Action for Application No. 2017-529986 dated Nov. 20, 2018; 2 pgs.

* cited by examiner

2D SCANNER
FRAME OF REFERENCE

OBJECT
FRAME OF REFERENCE

USING A TWO-DIMENSIONAL SCANNER TO SPEED REGISTRATION OF THREE-DIMENSIONAL SCAN DATA

CROSS-REFERENCE TO RELATED APPLICATIONS

The present application is a continuation application of U.S. patent application Ser. No. 14/559,290, filed on Dec. 3, 2014, which claims the benefit of International Patent Application No. PCT/IB2013/003082, filed Sep. 27, 2013, which claims the benefit of German Patent Application No. 10 2012 109 481.0, filed Oct. 5, 2012 and of U.S. Patent Application No. 61/716,845, filed Oct. 22, 2012, the contents of all of which are incorporated by reference herein.

BACKGROUND

U.S. Pat. No. 8,705,016 ('016) describes a laser scanner which, through use of a rotatable mirror, emits a light beam into its environment to generate a three-dimensional (3D) scan. The contents of this patent are incorporated herein by reference.

The subject matter disclosed herein relates to use of a 3D laser scanner time-of-flight (TOF) coordinate measurement device. A 3D laser scanner of this type steers a beam of light to a non-cooperative target such as a diffusely scattering surface of an object. A distance meter in the device measures a distance to the object, and angular encoders measure the angles of rotation of two axles in the device. The measured distance and two angles enable a processor in the device to determine the 3D coordinates of the target.

A TOF laser scanner is a scanner in which the distance to a target point is determined based on the speed of light in air between the scanner and a target point. Laser scanners are typically used for scanning closed or open spaces such as interior areas of buildings, industrial installations and tunnels. They may be used, for example, in industrial applications and accident reconstruction applications. A laser scanner optically scans and measures objects in a volume around the scanner through the acquisition of data points representing object surfaces within the volume. Such data points are obtained by transmitting a beam of light onto the objects and collecting the reflected or scattered light to determine the distance, two-angles (i.e., an azimuth and a zenith angle), and optionally a gray-scale value. This raw scan data is collected, stored and sent to a processor or processors to generate a 3D image representing the scanned area or object.

Generating an image requires at least three values for each data point. These three values may include the distance and two angles, or may be transformed values, such as the x, y, z coordinates. In an embodiment, an image is also based on a fourth gray-scale value, which is a value related to irradiance of scattered light returning to the scanner.

Most TOF scanners direct the beam of light within the measurement volume by steering the light with a beam steering mechanism. The beam steering mechanism includes a first motor that steers the beam of light about a first axis by a first angle that is measured by a first angular encoder (or other angle transducer). The beam steering mechanism also includes a second motor that steers the beam of light about a second axis by a second angle that is measured by a second angular encoder (or other angle transducer).

Many contemporary laser scanners include a camera mounted on the laser scanner for gathering camera digital images of the environment and for presenting the camera digital images to an operator of the laser scanner. By viewing the camera images, the operator of the scanner can determine the field of view of the measured volume and adjust settings on the laser scanner to measure over a larger or smaller region of space. In addition, the camera digital images may be transmitted to a processor to add color to the scanner image. To generate a color scanner image, at least three positional coordinates (such as x, y, z) and three color values (such as red, green, blue "RGB") are collected for each data point.

A 3D image of a scene may require multiple scans from different registration positions. The overlapping scans are registered in a joint coordinate system, for example, as described in U.S. Published Patent Application No. 2012/0069352 ('352), the contents of which are incorporated herein by reference. Such registration is performed by matching targets in overlapping regions of the multiple scans. The targets may be artificial targets such as spheres or checkerboards or they may be natural features such as corners or edges of walls. Some registration procedures involve relatively time-consuming manual procedures such as identifying by a user each target and matching the targets obtained by the scanner in each of the different registration positions. Some registration procedures also require establishing an external "control network" of registration targets measured by an external device such as a total station. The registration method disclosed in '352 eliminates the need for user matching of registration targets and establishing of a control network.

However, even with the simplifications provided by the methods of '352, it is today still difficult to remove the need for a user to carry out the manual registration steps as described above. In a typical case, only 30% of 3D scans can be automatically registered to scans taken from other registration positions. Today such registration is seldom carried out at the site of the 3D measurement but instead in an office following the scanning procedure. In a typical case, a project requiring a week of scanning requires two to five days to manually register the multiple scans. This adds to the cost of the scanning project. Furthermore, the manual registration process sometimes reveals that the overlap between adjacent scans was insufficient to provide proper registration. In other cases, the manual registration process may reveal that certain sections of the scanning environment have been omitted. When such problems occur, the operator must return to the site to obtain additional scans. In some cases, it is not possible to return to a site. A building that was available for scanning at one time may be impossible to access at a later time. A forensics scene of an automobile accident or a homicide is often not available for taking of scans for more than a short time after the incident.

Accordingly, while existing 3D scanners are suitable for their intended purposes, what is needed is a 3D scanner having certain features of embodiments of the present invention.

BRIEF DESCRIPTION

According to one aspect of the invention, a three-dimensional (3D) measuring device includes: one or more processors; a 3D scanner operable to cooperate with the one or more processors to determine 3D coordinates of a first object point, the 3D scanner being movable from a first position to a second position; a 2D scanner operably coupled to the 3D scanner, the 2D scanner being operable to cooperate with the one or more processors to determine 2D coordinates of a second object point, the 2D scanner being movable from a third position to a fourth position; wherein the one or more processors responsive to executable instructions which when executed by the processor system is operable to: cause the 3D scanner, while positioned at a first position, to determine 3D coordinates of a first collection of points on an object surface; cause the 2D scanner, while moving from the third position to the fourth position, to obtain a plurality of 2D scan sets, each of the plurality of 2D scan sets being a set of 2D coordinates of points on the object surface collected by the 2D scanner at a different position relative to the first position; determine a first translation value, a second translation value, and a first rotation value based at least in part on a fitting of the plurality of 2D scan sets; cause the 3D scanner, positioned at the second position, to determine 3D coordinates of a second collection of points on the object surface; identify a correspondence between registration targets in the first collection of points and the second collection of points based at least in part on the first translation value, the second translation value, and the first rotation value; and determine 3D coordinates of a registered 3D collection of points based on a correspondence among registration targets, the 3D coordinates of the first collection of points, and the 3D coordinates of the second collection of points.

In a further aspect of the invention, a method is provided for measuring and registering three-dimensional (3D) coordinates. The method includes scanning an object surface with a 3D scanner positioned at a first position, to determine 3D coordinates of a first collection of points on the object surface, the 3D scanner being movable from the first position to a second position; scanning with a 2D scanner while moving the 2D scanner from a third position to a fourth position, to obtain a plurality of 2D scan sets, each of the plurality of 2D scan sets being a set of 2D coordinates of points on the object surface collected by the 2D scanner at a different position relative to the first position, the 2D scanner being operably coupled to the 3D scanner; determining with one or more processors a first translation value, a second translation value, and a first rotation value based at least in part on a fitting of the plurality of 2D scan sets, the one or more processors being operably coupled to the 3D scanner and the 2D scanner; scanning the object surface with the 3D scanner positioned at the second position to determine 3D coordinates of a second collection of points on the object surface; identifying with the one or more processors a correspondence between registration targets in the first collection of points and the second collection of points based at least in part on the first translation value, the second translation value, and the first rotation value; and determining with the one or more processors 3D coordinates of a registered 3D collection of points based on a correspondence among registration targets, the 3D coordinates of the first collection of points, and the 3D coordinates of the second collection of points.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

The present invention relates to a device that includes a 3D scanner and a 2D scanner working cooperatively to provide automatic registration of 3D scans.

Figure 1:
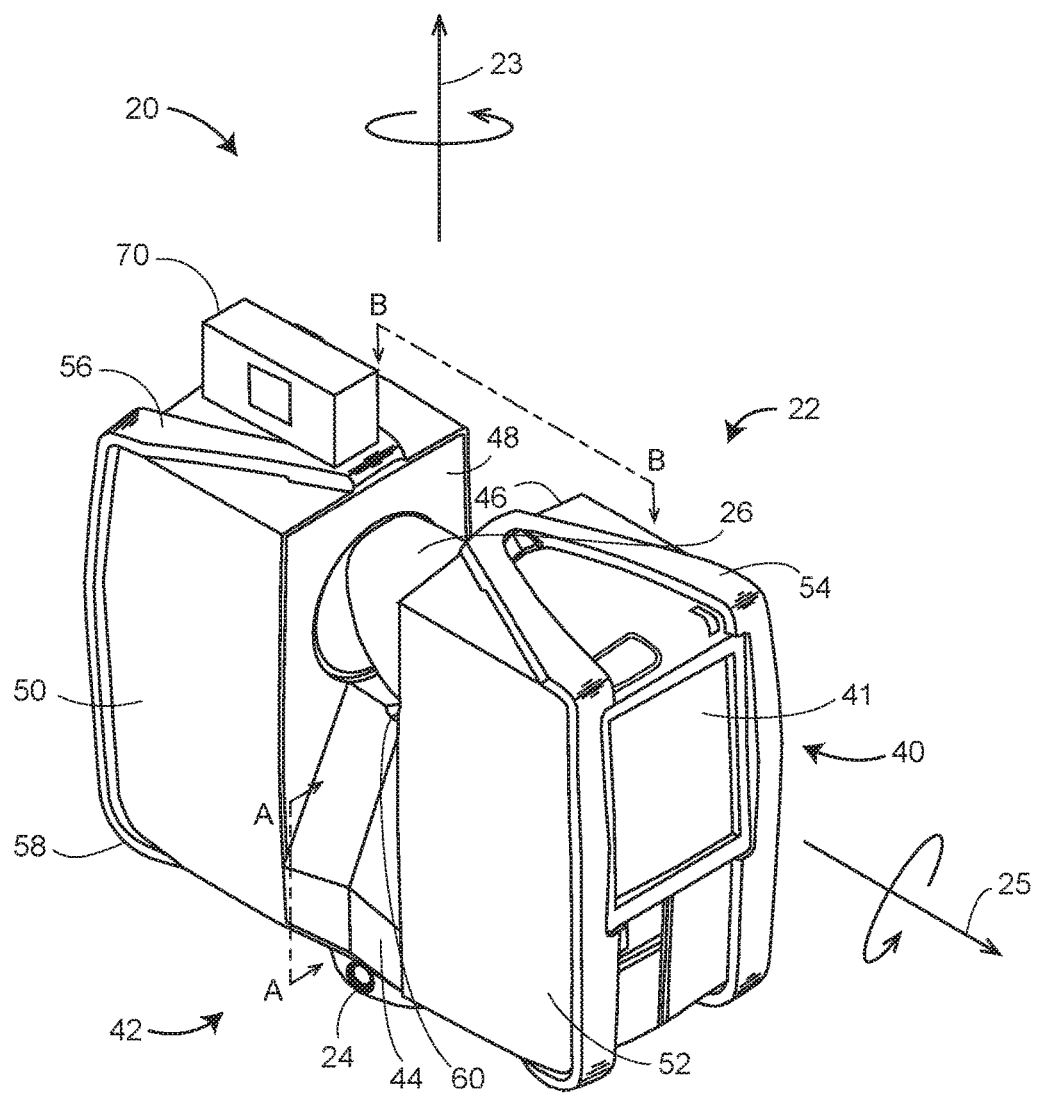
FIG. 1 is a perspective view of a laser scanner in accordance with an embodiment of the invention.
Figure 2:
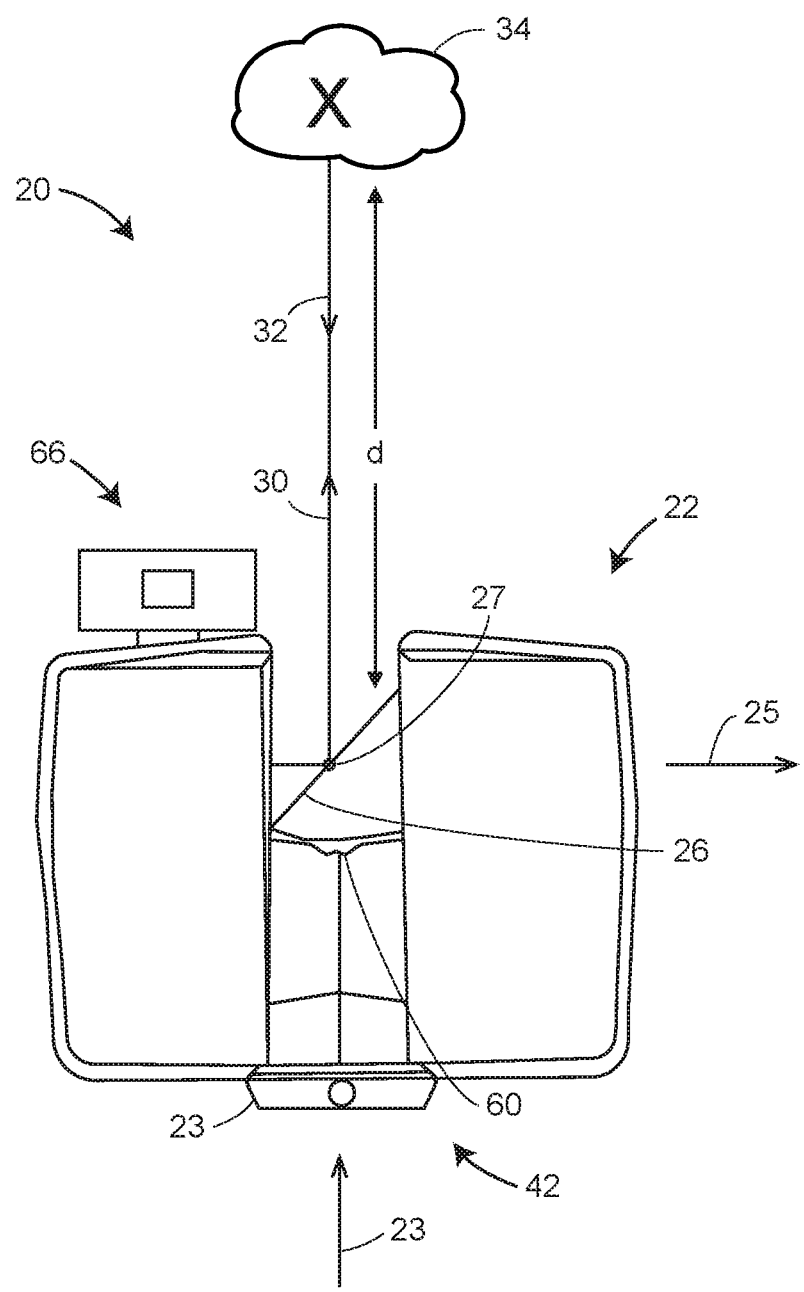
FIG. 2 is a side view of the laser scanner illustrating a method of measurement.
Figure 3:
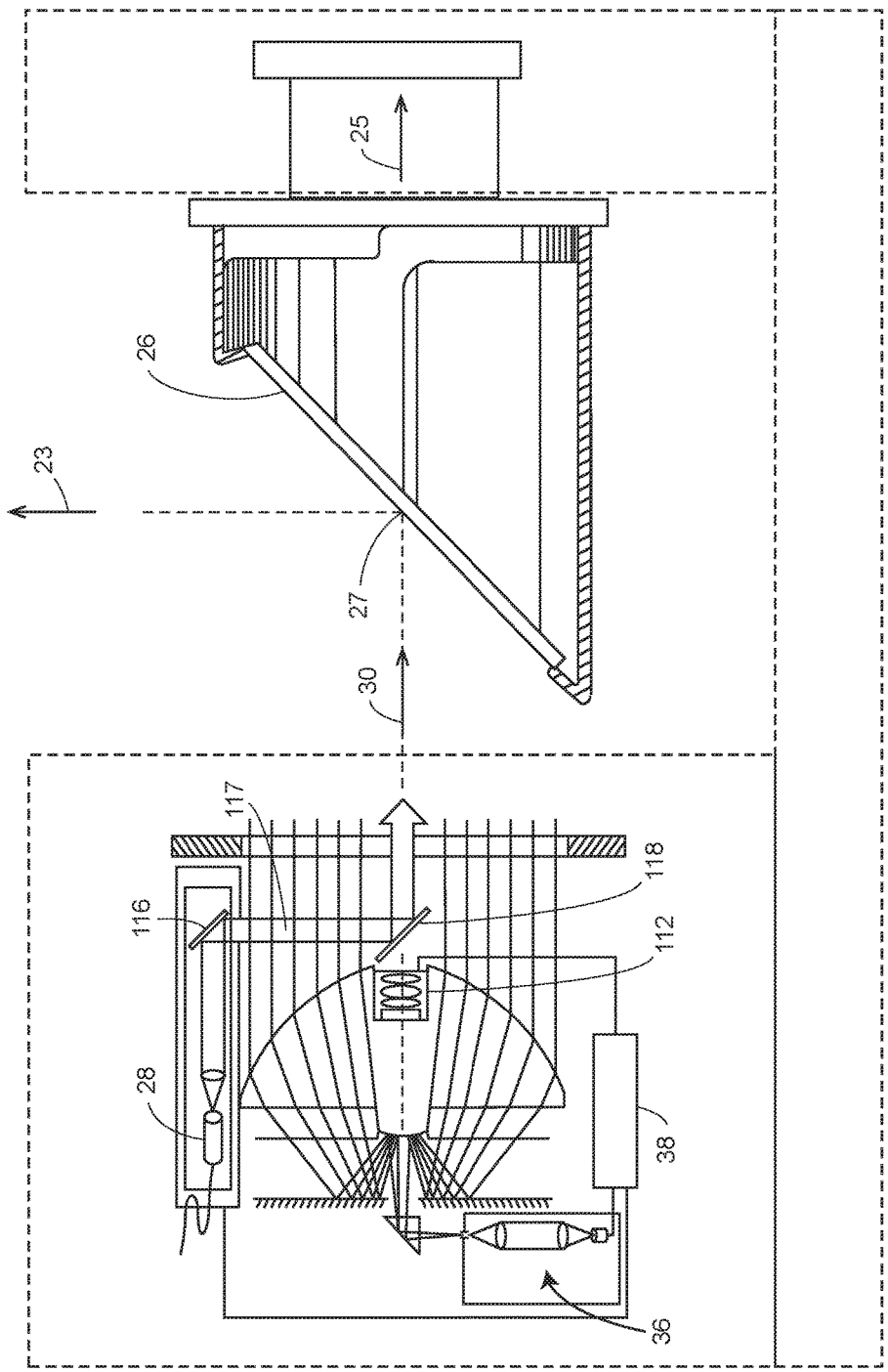
FIG. 3 is a schematic illustration of the optical, mechanical, and electrical components of the laser scanner.

Referring now to FIGS. 1-3, a laser scanner 20 is shown for optically scanning and measuring the environment surrounding the laser scanner 20. The laser scanner 20 has a measuring head 22 and a base 24. The measuring head 22 is mounted on the base 24 such that the laser scanner 20 may be rotated about a vertical axis 23. In one embodiment, the measuring head 22 includes a gimbal point 27 that is a center of rotation about the vertical axis 23 and a horizontal axis 25. The measuring head 22 has a rotary mirror 26, which may be rotated about the horizontal axis 25. The rotation about the vertical axis may be about the center of the base 24. The terms vertical axis and horizontal axis refer to the scanner in its normal upright position. It is possible to operate a 3D coordinate measurement device on its side or upside down, and so to avoid confusion, the terms azimuth axis and zenith axis may be substituted for the terms vertical axis and horizontal axis, respectively. The term pan axis or standing axis may also be used as an alternative to vertical axis.

The measuring head 22 is further provided with an electromagnetic radiation emitter, such as light emitter 28, for example, that emits an emitted light beam 30. In one embodiment, the emitted light beam 30 is a coherent light beam such as a laser beam. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam 30 is amplitude or intensity modulated, for example, with a sinusoidal waveform or with a rectangular waveform. The emitted light beam 30 is emitted by the light emitter 28 onto the rotary mirror 26, where it is deflected to the environment. A reflected light beam 32 is reflected from the environment by an object 34. The reflected or scattered light is intercepted by the rotary mirror 26 and directed into a light receiver 36. The directions of the emitted light beam 30 and the reflected light beam 32 result from the angular positions of the rotary mirror 26 and the measuring head 22 about the axes 25 and 23, respectively. These angular positions in turn depend on the corresponding rotary drives or motors.

Coupled to the light emitter 28 and the light receiver 36 is a controller 38. The controller 38 determines, for a multitude of measuring points X, a corresponding number of distances d between the laser scanner 20 and the points X on object 34. The distance to a particular point X is determined based at least in part on the speed of light in air through which electromagnetic radiation propagates from the device to the object point X. In one embodiment the phase shift of modulation in light emitted by the laser scanner 20 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

In one mode of operation, the scanning of the volume around the laser scanner 20 takes place by rotating the rotary mirror 26 about axis 25 relatively quickly while rotating the measuring head 22 about axis 23 relatively slowly, thereby moving the assembly in a spiral pattern. In an exemplary embodiment, the rotary mirror rotates at a maximum speed of 5820 revolutions per minute. For such a scan, the gimbal point 27 defines the origin of the local stationary reference system. The base 24 rests in this local stationary reference system.

In addition to measuring a distance d from the gimbal point 27 to an object point X, the scanner 20 may also collect gray-scale information related to the received optical power (equivalent to the term "brightness.") The gray-scale value may be determined at least in part, for example, by integration of the bandpass-filtered and amplified signal in the light receiver 36 over a measuring period attributed to the object point X.

The measuring head 22 may include a display device 40 integrated into the laser scanner 20. The display device 40 may include a graphical touch screen 41, as shown in FIG. 1, which allows the operator to set the parameters or initiate the operation of the laser scanner 20. For example, the screen 41 may have a user interface that allows the operator to provide measurement instructions to the device, and the screen may also display measurement results.

The laser scanner 20 includes a carrying structure 42 that provides a frame for the measuring head 22 and a platform for attaching the components of the laser scanner 20. In one embodiment, the carrying structure 42 is made from a metal such as aluminum. The carrying structure 42 includes a traverse member 44 having a pair of walls 46, 48 on opposing ends. The walls 46, 48 are parallel to each other and extend in a direction opposite the base 24. Shells 50, 52 are coupled to the walls 46, 48 and cover the components of the laser scanner 20. In the exemplary embodiment, the shells 50, 52 are made from a plastic material, such as polycarbonate or polyethylene for example. The shells 50, 52 cooperate with the walls 46, 48 to form a housing for the laser scanner 20.

On an end of the shells 50, 52 opposite the walls 46, 48 a pair of yokes 54, 56 are arranged to partially cover the respective shells 50, 52. In the exemplary embodiment, the yokes 54, 56 are made from a suitably durable material, such as aluminum for example, that assists in protecting the shells 50, 52 during transport and operation. The yokes 54, 56 each includes a first arm portion 58 that is coupled, such as with a fastener for example, to the traverse 44 adjacent the base 24. The arm portion 58 for each yoke 54, 56 extends from the traverse 44 obliquely to an outer corner of the respective shell 50, 54. From the outer corner of the shell, the yokes 54, 56 extend along the side edge of the shell to an opposite outer corner of the shell. Each yoke 54, 56 further includes a second arm portion that extends obliquely to the walls 46, 48. It should be appreciated that the yokes 54, 56 may be coupled to the traverse 42, the walls 46, 48 and the shells 50, 54 at multiple locations.

The pair of yokes 54, 56 cooperate to circumscribe a convex space within which the two shells 50, 52 are arranged. In the exemplary embodiment, the yokes 54, 56 cooperate to cover all of the outer edges of the shells 50, 54, while the top and bottom arm portions project over at least a portion of the top and bottom edges of the shells 50, 52. This provides advantages in protecting the shells 50, 52 and the measuring head 22 from damage during transportation and operation. In other embodiments, the yokes 54, 56 may include additional features, such as handles to facilitate the carrying of the laser scanner 20 or attachment points for accessories for example.

On top of the traverse 44, a prism 60 is provided. The prism extends parallel to the walls 46, 48. In the exemplary embodiment, the prism 60 is integrally formed as part of the carrying structure 42. In other embodiments, the prism 60 is a separate component that is coupled to the traverse 44. When the mirror 26 rotates, during each rotation the mirror 26 directs the emitted light beam 30 onto the traverse 44 and the prism 60. Due to non-linearities in the electronic components, for example in the light receiver 36, the measured distances d may depend on signal strength, which may be measured in optical power entering the scanner or optical power entering optical detectors within the light receiver 36, for example. In an embodiment, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 36. Since the prism 60 is at a known distance from the gimbal point 27, the measured optical power level of light reflected by the prism 60 may be used to correct distance measurements for other measured points, thereby allowing for compensation to correct for the effects of environmental variables such as temperature. In the exemplary embodiment, the resulting correction of distance is performed by the controller 38.

In an embodiment, the base 24 is coupled to a swivel assembly (not shown) such as that described in commonly owned U.S. Pat. No. 8,705,012 ('012), which is incorporated by reference herein. The swivel assembly is housed within the carrying structure 42 and includes a motor that is configured to rotate the measuring head 22 about the axis 23.

An auxiliary image acquisition device 66 may be a device that captures and measures a parameter associated with the scanned volume or the scanned object and provides a signal representing the measured quantities over an image acquisition area. The auxiliary image acquisition device 66 may be, but is not limited to, a pyrometer, a thermal imager, an ionizing radiation detector, or a millimeter-wave detector.

In an embodiment, a camera (first image acquisition device) 112 is located internally to the scanner and may have the same optical axis as the 3D scanner device. In this embodiment, the first image acquisition device 112 is integrated into the measuring head 22 and arranged to acquire images along the same optical pathway as emitted light beam 30 and reflected light beam 32. In this embodiment, the light from the light emitter 28 reflects off a fixed mirror 116 and travels to dichroic beam-splitter 118 that reflects the light 117 from the light emitter 28 onto the rotary mirror 26. The dichroic beam-splitter 118 allows light to pass through at wavelengths different than the wavelength of light 117. For example, the light emitter 28 may be a near infrared laser light (for example, light at wavelengths of 780 nm or 1150 nm), with the dichroic beam-splitter 118 configured to reflect the infrared laser light while allowing visible light (e.g., wavelengths of 400 to 700 nm) to transmit through. In other embodiments, the determination of whether the light passes through the beam-splitter 118 or is reflected depends on the polarization of the light. The digital camera 112 takes 2D photographic images of the scanned area to capture color data to add to the scanned image. In the case of a built-in color camera having an optical axis coincident with that of the 3D scanning device, the direction of the camera view may be easily obtained by simply adjusting the steering mechanisms of the scanner—for example, by adjusting the azimuth angle about the axis 23 and by steering the mirror 26 about the axis 25.

Figure 4:
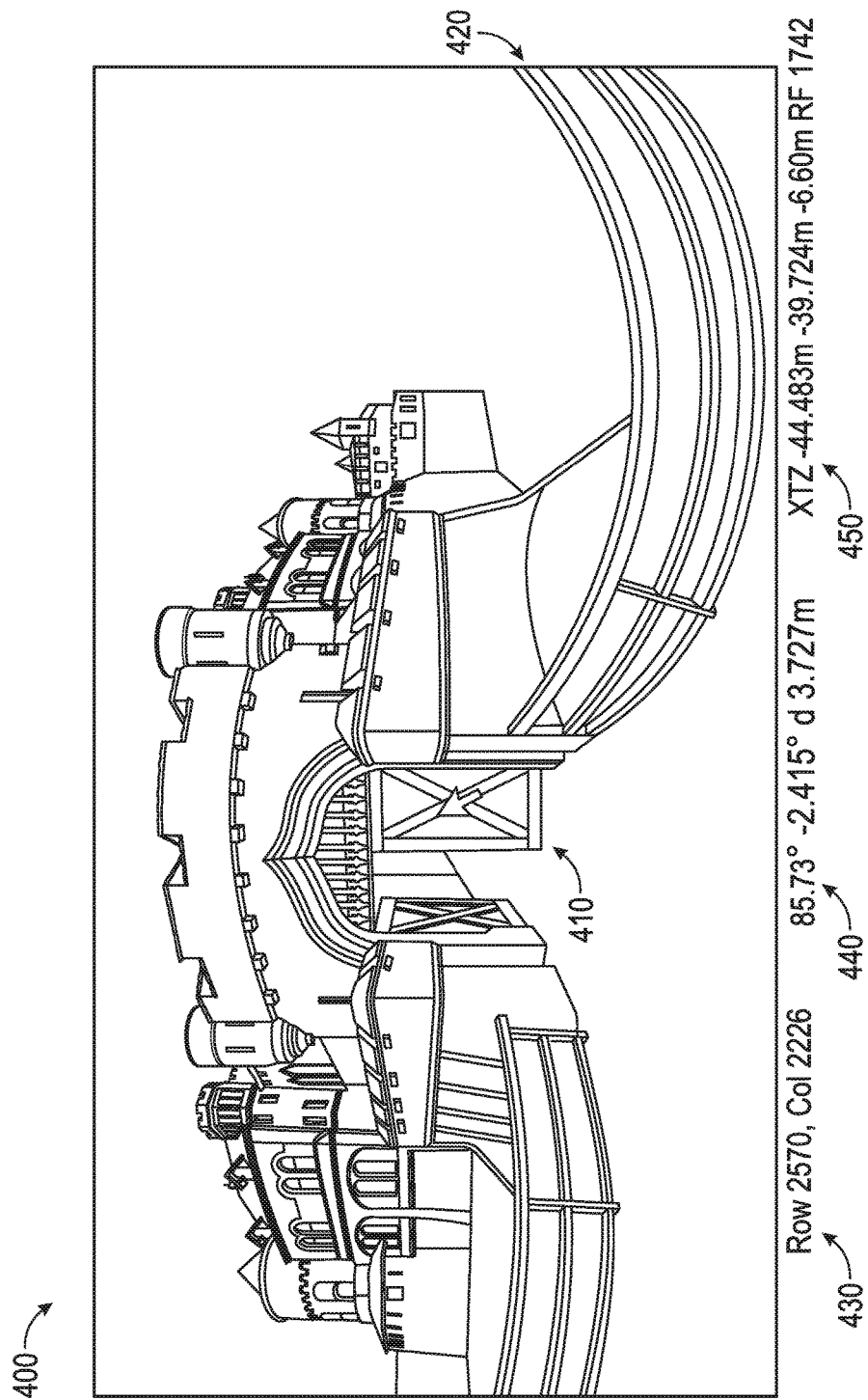
FIG. 4 depicts a planar view of a 3D scanned image.

FIG. 4 depicts an example of a planar view of a 3D scanned image 400. The planar view depicted in FIG. 4 maps an image based on direct mapping of data collected by the scanner. The scanner collects data in a spherical pattern but with data points collected near the poles more tightly compressed than those collected nearer the horizon. In other words, each point collected near a pole represents a smaller solid angle than does each point collected nearer the horizon. Since data from the scanner may be directly represented in rows and column, data in a planar image is conveniently presented in a rectilinear format, as shown in FIG. 4. With planar mapping described above, straight lines appear to be curved, as for example the straight fence railings 420 that appear curved in the planar view of the 3D image. The planar view may be a 3D unprocessed scanned image displaying just the gray-scale values received from the distance sensor arranged in columns and rows as they were recorded. In addition, the 3D unprocessed scanned image of the planar view may be in full resolution or reduced resolution depending on system characteristics (e.g., display device, storage, processor). The planar view may be a 3D processed scanned image that depicts either gray-scale values (resulting from the light irradiance measured by the distance sensor for each pixel) or color values (resulting from camera images which have been mapped onto the scan). Although the planar view extracted from the 3D scanner is ordinarily a gray-scale or color image, FIG. 4 is shown as a line drawing for clarity in document reproduction. The user interface associated with the display unit, which may be integral to the laser scanner, may provide a point selection mechanism, which in FIG. 4 is the cursor 410. The point selection mechanism may be used to reveal dimensional information about the volume of space being measured by the laser scanner. In FIG. 4, the row and column at the location of the cursor are indicated on the display at 430. The two measured angles and one measured distance (the 3D coordinates in a spherical coordinate system) at the cursor location are indicated on the display at 440. Cartesian XYZ coordinate representations of the cursor location are indicated on the display at 450.

Figure 5:
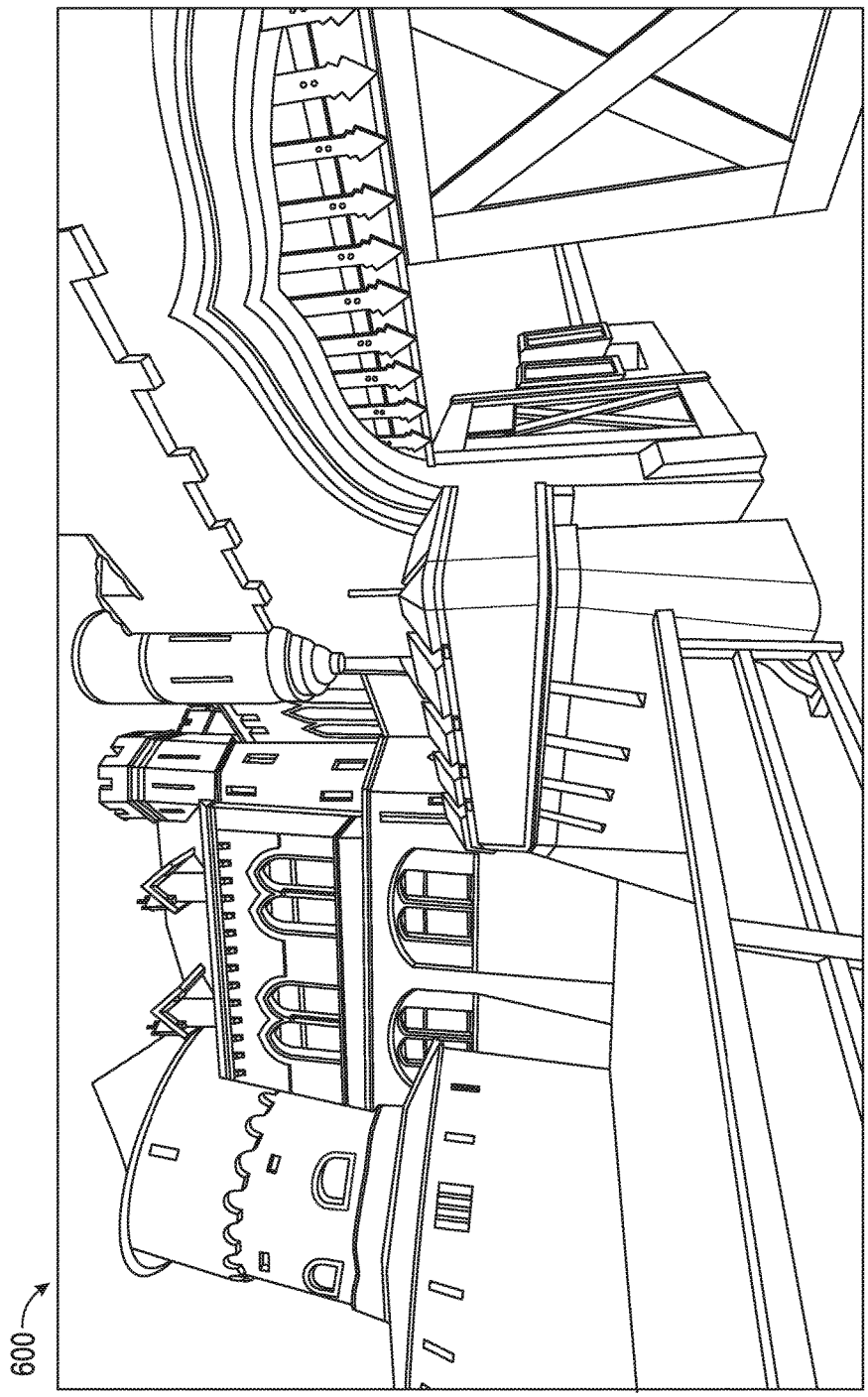
FIG. 5 depicts an embodiment of a panoramic view of a 3D scanned image generated by mapping a planar view onto a sphere.

FIG. 5 depicts an example of a panoramic view of a 3D scanned image 600 generated by mapping a planar view onto a sphere, or in some cases a cylinder. A panoramic view can be a 3D processed scanned image (such as that shown in FIG. 5) in which 3D information (e.g., 3D coordinates) is available. The panoramic view may be in full resolution or reduced resolution depending on system characteristics. It should be pointed out that an image such as FIG. 5 is a 2D image that represents a 3D scene when viewed from a particular perspective. In this sense, the image of FIG. 5 is much like an image that might be captured by a 2D camera or a human eye. Although the panoramic view extracted from the 3D scanner is ordinarily a gray-scale or color image, FIG. 5 is shown as a line drawing for clarity in document reproduction.

The term panoramic view refers to a display in which angular movement is generally possible about a point in space, but translational movement is not possible (for a single panoramic image). In contrast, the term 3D view as used herein refers to generally refers to a display in which provision is made (through user controls) to enable not only rotation about a fixed point but also translational movement from point to point in space.

Figure 6C:
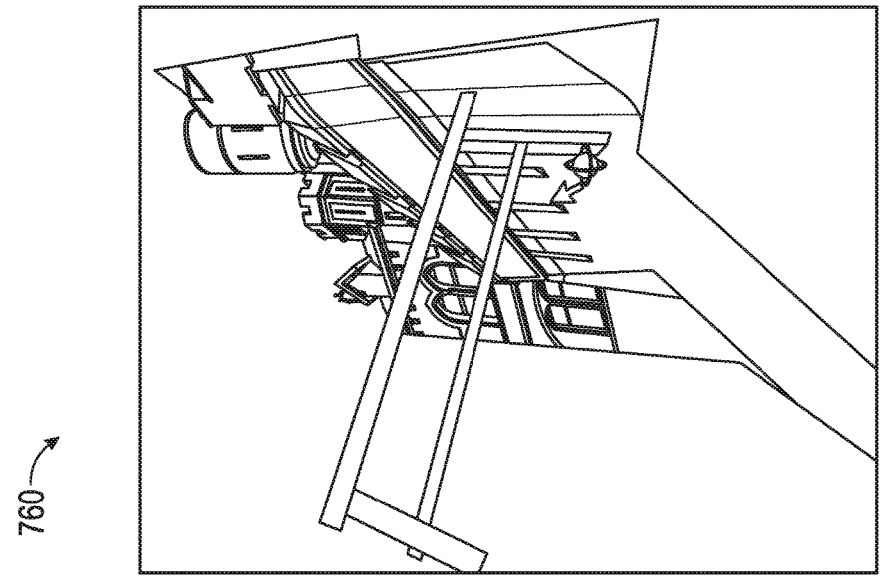
FIGS. 6A, 6B and 6C depict embodiments of a 3D view of a 3D scanned image.
Figure 6B:
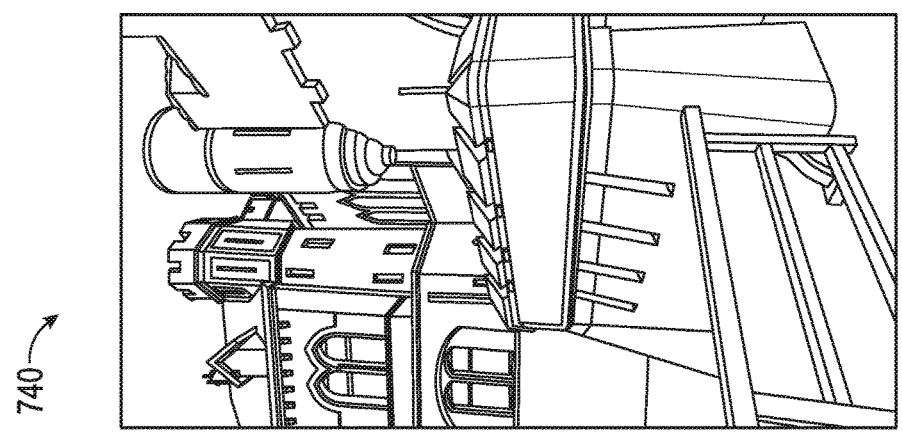
Figure 6A:
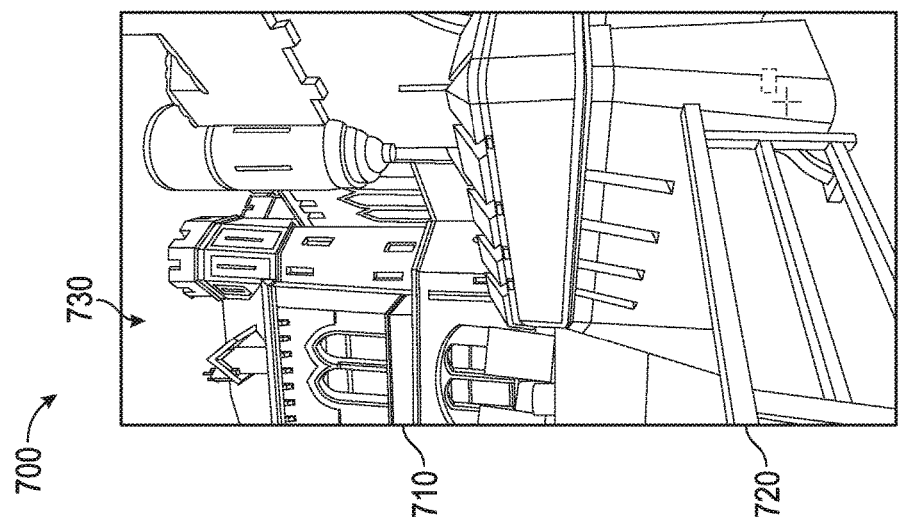
Figure 7:
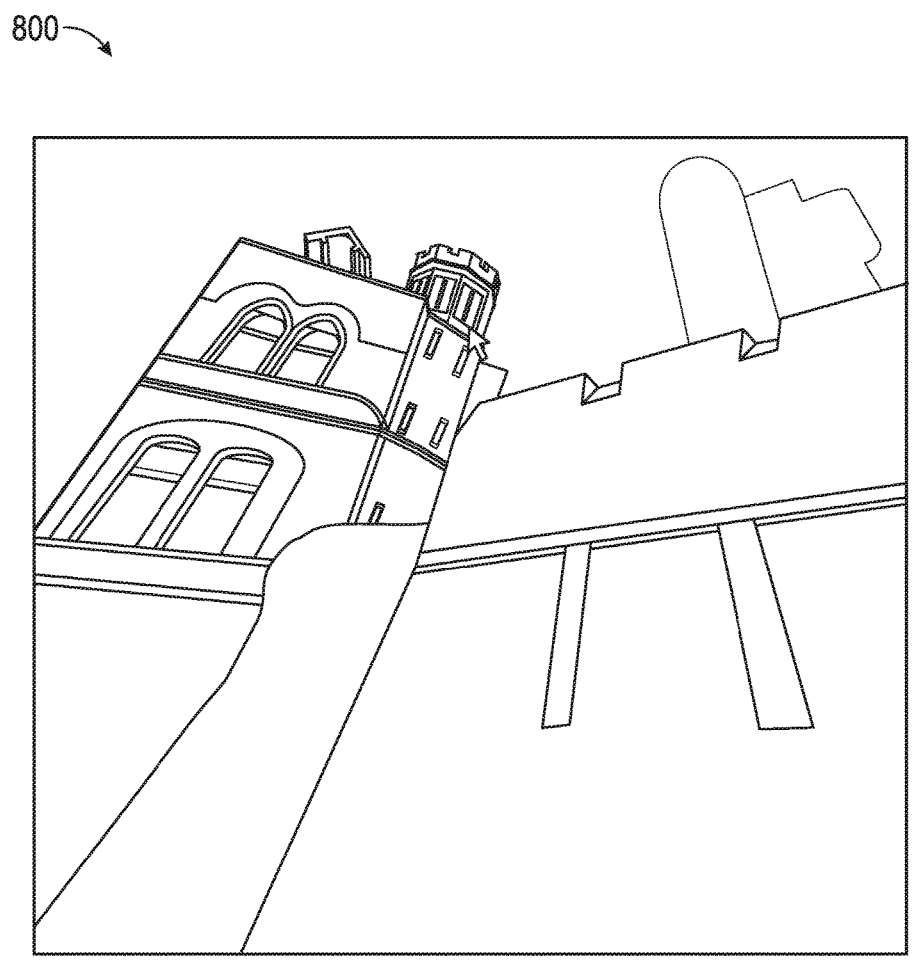
FIG. 7 depicts an embodiment of a 3D view made up of an image of the object of FIG. 6B but viewed from a different perspective and shown only partially.

FIGS. 6A, 6B and 6C depict an example of a 3D view of a 3D scanned image. In the 3D view a user can leave the origin of the scan and see the scan points from different viewpoints and angles. The 3D view is an example of a 3D processed scanned image. The 3D view may be in full resolution or reduced resolution depending on system characteristics. In addition, the 3D view allows multiple registered scans to be displayed in one view. FIG. 6A is a 3D view 710 over which a selection mask 730 has been placed by a user. FIG. 6B is a 3D view 740 in which only that part of the 3D view 710 covered by the selection mask 730 has been retained. FIG. 6C shows the same 3D measurement data as in FIG. 6B except as rotated to obtain a different view. FIG. 7 shows a different view of FIG. 6B, the view in this instance being obtained from a translation and rotation of the observer viewpoint, as well as a reduction in observed area. Although the 3D views extracted from the 3D scanner are ordinarily a gray-scale or color image, FIGS. 6A-C and 7 are shown as line drawings for clarity in document reproduction.

Figure 8:
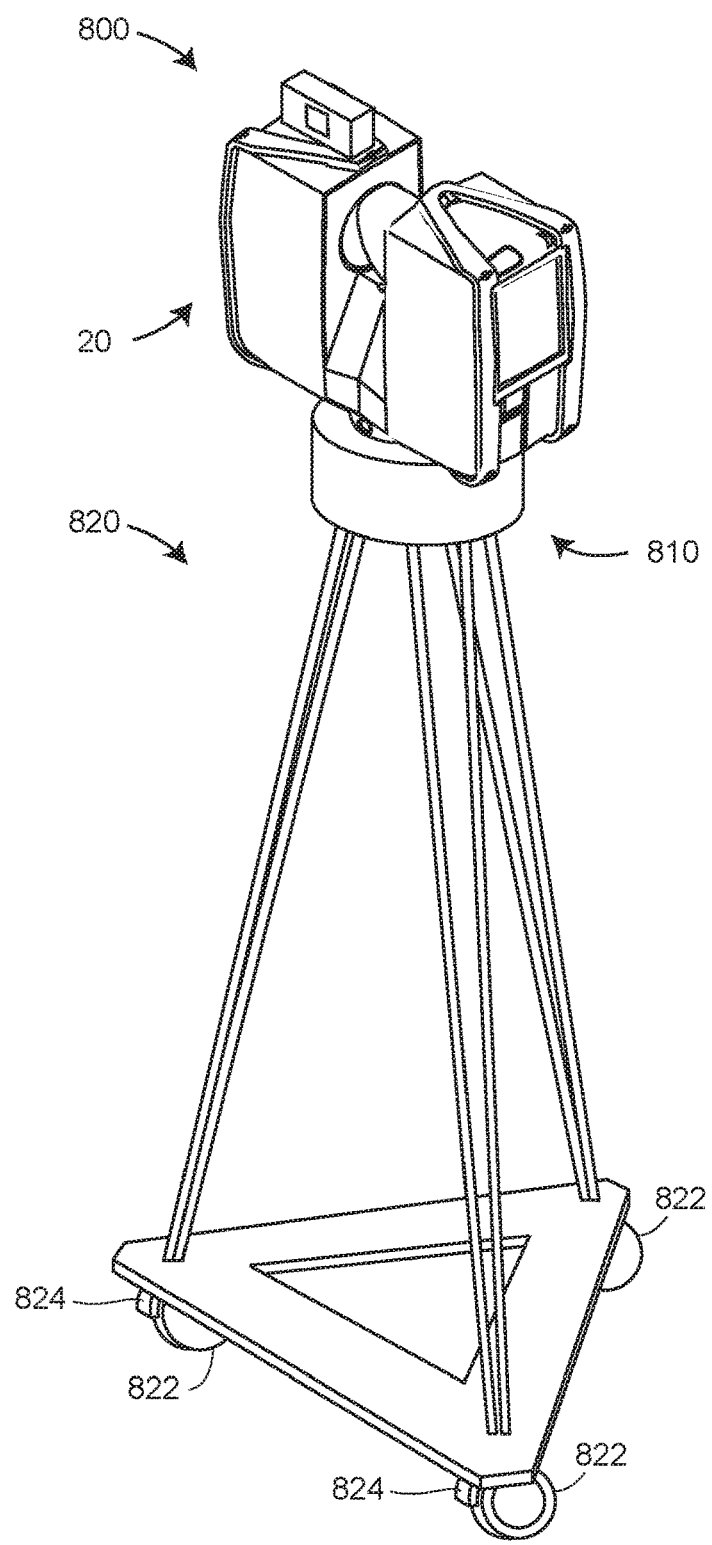
FIG. 8 is a perspective view of a 3D measuring device according to an embodiment.
Figure 9:
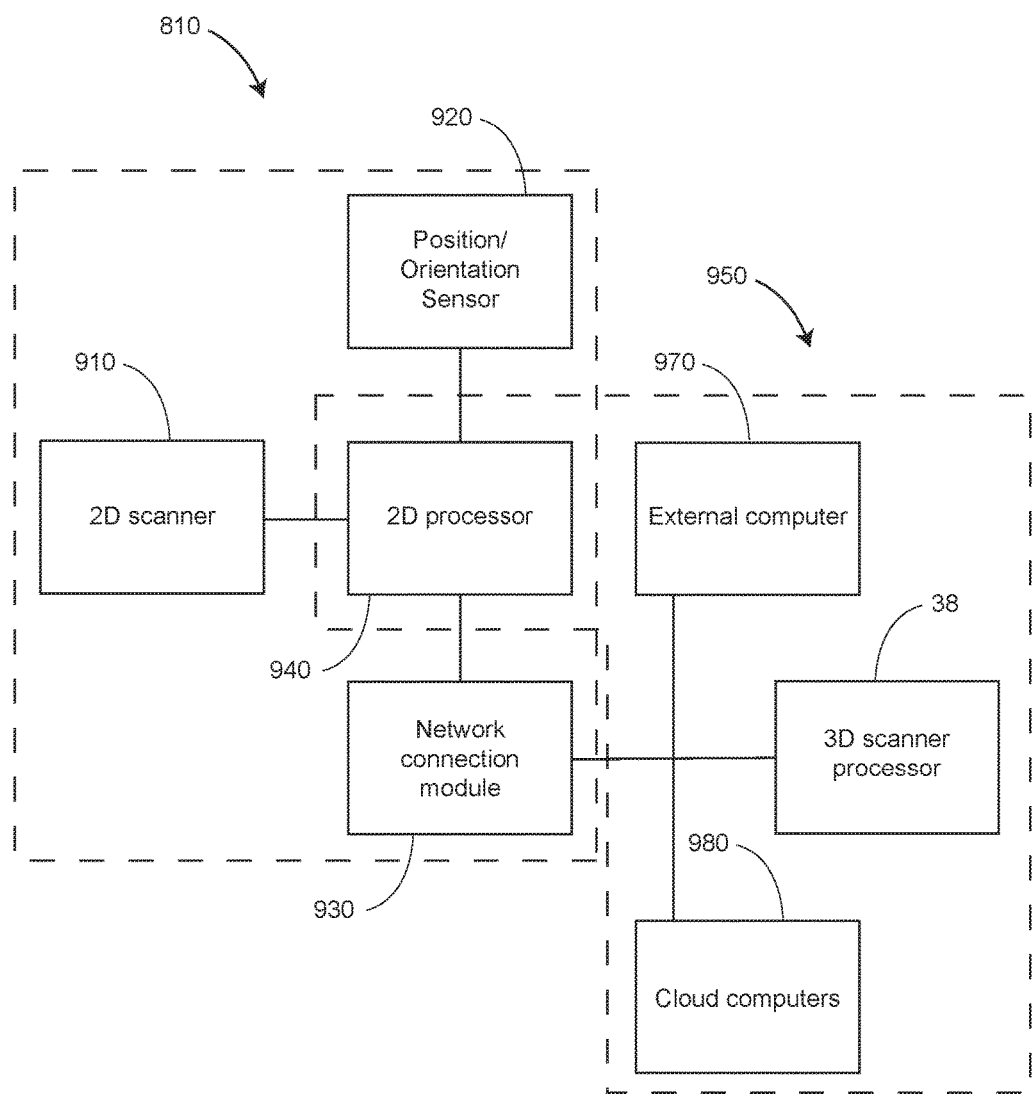
FIG. 9 is a block diagram depicting a 2D scanner accessory and a processor system according to an embodiment.

FIGS. 8 and 9 show an embodiment of a 3D measuring device 800 that includes a 3D scanner 20, a two-dimensional (2D) scanner accessory 810, a processor system 950, and an optional moveable platform 820. The 3D measuring device 800 may be a 3D TOF scanner 20 as described in reference to FIG. 1. The 2D scanner accessory 810 includes a 2D scanner 910 and may optionally include, as shown in FIG. 9, a 2D processor 940, a position/orientation sensor 920, and a network connection module 930.

The processor system 950 includes one or more processing elements that may include a 3D scanner processor (controller) 38, 2D processor 940, an external computer 970, and a cloud computer 980. The processors may be microprocessors, field programmable gate arrays (FPGAs), digital signal processors (DSPs), and generally any device capable of performing computing functions. The one or more processors have access to memory for storing information. In an embodiment illustrated in FIG. 9, the controller 38 represents one or more processors distributed throughout the 3D scanner. Also included in the embodiment of FIG. 9 are 2D processor 940 for the 2D scanner accessory 810, an external computer 970, and one or more cloud computers 980 for remote computing capability. In an alternative embodiment, only one or two of the processors 38, 960, 970, and 980 is provided in the processor system. Communication among the processors may be through wired links, wireless links, or a combination of wired and wireless links. In an embodiment, the connection between the processor of the 2D scanner accessory and the 3D scanner is made by IEEE 802.11 (Wi-Fi) through the network connection module 930. In an embodiment, scan results are uploaded after each scanning session to the cloud (remote network) for storage and future use.

The 2D scanner accessory 810 measures 2D coordinates in a plane. In most cases, it does this by steering light within a plane to illuminate object points in the environment. It collects the reflected (scattered) light from the object points to determine 2D coordinates of the object points in the 2D plane. In an embodiment, the 2D scanner scans a spot of light over an angle while at the same time measuring an angle value and corresponding distance value to each of the illuminated object points.

Examples of 2D scanners 910 that might be included in the 2D scanner accessory 810 include 2D scanners from the Sick LMS100 product family and 2D scanners from Hoyuko such as the Hoyuko models URG-04LX-UG01 and UTM-30LX. The scanners in the Sick LMS100 family measure angles over a 270 degree range and over distances up to 20 meters. The Hoyuko model URG-04LX-UG01 is a low-cost 2D scanner that measures angles over a 240 degree range and distances up to 4 meters. The Hoyuko model UTM-30LX is a 2D scanner that measures angles over a 270 degree range and to distances up to 30 meters. Many other types of 2D scanners are also available.

The optional position/orientation sensor 920 in the 2D scanner accessory 810 may include inclinometers (accelerometers), gyroscopes, magnetometers, and altimeters. Usually devices that include one or more of an inclinometer and gyroscope are referred to as an inertial measurement unit (IMU). In some cases, the term IMU is used in a broader sense to include a variety of additional devices that indicate position and/or orientation—for example, magnetometers that indicate heading based on changes in magnetic field direction relative to the earth's magnetic north and altimeters that indicate altitude (height). An example of a widely used altimeter is a pressure sensor. By combining readings from a combination of position/orientation sensors with a fusion algorithm that may include a Kalman filter, relatively accurate position and orientation measurements can be obtained using relatively low-cost sensor devices.

The optional moveable platform 820 enables the 3D measuring device 20 to be moved from place to place, typically along a floor that is approximately horizontal. In an embodiment, the optional moveable platform 820 is a tripod that includes wheels 822. In an embodiment, the wheels 822 may be locked in place using wheel brakes 824. In another embodiment, the wheels 822 are retractable, enabling the tripod to sit stably on three feet attached to the tripod. In another embodiment, the tripod has no wheels but is simply pushed or pulled along a surface that is approximately horizontal, for example, a floor. In another embodiment, the optional moveable platform 820 is a wheeled cart that may be hand pushed/pulled or motorized.

In an embodiment, the 2D scanner accessory 810 is mounted between the moveable platform 820 and the 3D scanner 20 as shown in FIG. 8. In another embodiment, the 2D scanner accessory 810 is integrated into the 3D scanner 20. In another embodiment, the 2D scanner accessory 810 is mounted on the moveable platform 820, for example, on a leg of a tripod or between the legs of the tripod. In another embodiment, the 2D scanner accessory 810 is mounted on the body of the 3D scanner, for example, in a position similar to that of element 70 in FIG. 1. In another embodiment, the 2D scanner 910 is attached to a leg of a tripod while other parts of the 2D scanner accessory 810 are internal to the 3D scanner 20.

In an embodiment, the 2D scanner 910 is oriented so as to scan a beam of light over a range of angles in a horizontal plane. At instants in time the 2D scanner 910 returns an angle reading and a corresponding distance reading to provide 2D coordinates of object points in the horizontal plane. In completing one scan over the full range of angles, the 2D scanner returns a collection of paired angle and distance readings. As the 3D measuring device 800 is moved from place to place, the 2D scanner 910 continues to return 2D coordinate values. These 2D coordinate values are used to locate the position of the 3D scanner 20 at each stationary registration position, thereby enabling more accurate registration.

Figure 10:
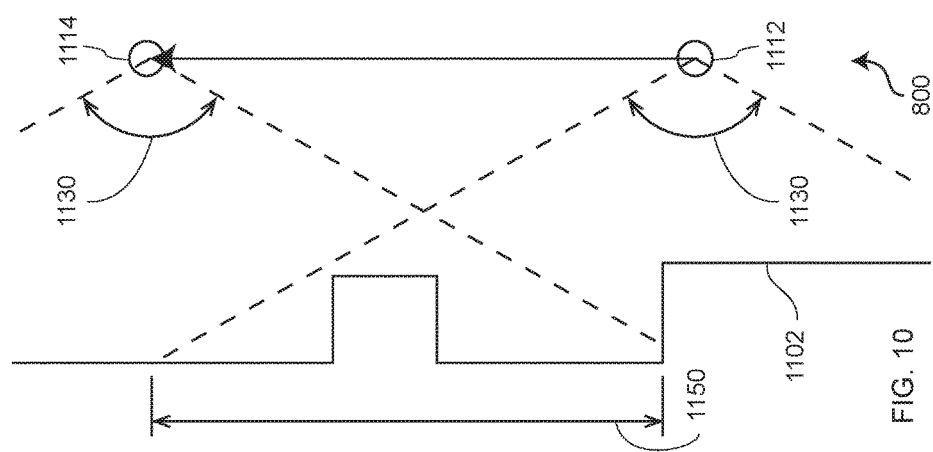
FIG. 10 is a schematic representation of a 3D scanner measuring an object from two registration positions according to an embodiment.

FIG. 10 shows the 3D measuring device 800 moved to a first registration position 1112 in front of an object 1102 that is to be measured. The object 1102 might for example be a wall in a room. In an embodiment, the 3D measuring device 800 is brought to a stop and is held in place with brakes, which in an embodiment are brakes 824 on wheels 822. The 3D scanner 20 in the 3D measuring device 800 takes a first 3D scan of the object 1102. In an embodiment, the 3D scanner 20 may if desired obtain 3D measurements in all directions except in downward directions blocked by the structure of the 3D measuring device 800. However, in the example of FIG. 10, in which 3D scanner 20 measures a long, mostly flat structure 1102, a smaller effective FOV 1130 may be selected to provide a more face-on view of features on the structure.

When the first 3D scan is completed, the processor system 950 receives a signal indicating that 2D scan data is being collected. This signal may come from the position/orientation sensor 920 in response to the sensor 920 detecting a movement of the 3D measuring device 800. The signal may be sent when the brakes are released, or it may be sent in response to a command sent by an operator. The 2D scanner accessory 810 may start to collect data when the 3D measuring device 800 starts to move, or it may continually collect 2D scan data, even when the 2D scanner accessory 810 is stationary. In an embodiment, the 2D scanner data is sent to the processor system 950 as it is collected.

In an embodiment, the 2D scanner accessory 810 measures as the 3D measuring device 800 is moved toward the second registration position 1114. In an embodiment, 2D scan data is collected and processed as the scanner passes through a plurality of 2D measuring positions 1120. At each measuring position 1120, the 2D scanner collects 2D coordinate data over an effective FOV 1140. Using methods described in more detail below, the processor system 950 uses 2D scan data from the plurality of 2D scans at positions 1120 to determine a position and orientation of the 3D scanner 20 at the second registration position 1114 relative to the first registration position 1112, where the first registration position and the second registration position are known in a 3D coordinate system common to both. In an embodiment, the common coordinate system is represented by 2D Cartesian coordinates x, y and by an angle of rotation θ relative to the x or y axis. In an embodiment, the x and y axes lie in the plane of the scanner and may be further based on a direction of a "front" of the 2D scanner 910. An example of such an (x, y, θ) coordinate system is the coordinate system 1410 of FIG. 14A.

On the object 1102, there is a region of overlap 1150 between the first 3D scan (collected at the first registration position 1112) and the second 3D scan (collected at the second registration position 1114). In the overlap region 1150 there are registration targets (which may be natural features of the object 1102) that are seen in both the first 3D scan and the second 3D scan. A problem that often occurs in practice is that, in moving the 3D scanner 20 from the first registration position 1112 to the second registration position 1114, the processor system 950 loses track of the position and orientation of the 3D scanner 20 and hence is unable to correctly associate the registration targets in the overlap regions to enable the registration procedure to be performed reliably. By using the succession of 2D scans, the processor system 950 is able to determine the position and orientation of the 3D scanner 20 at the second registration position 1114 relative to the first registration position 1112. This information enables the processor system 950 to correctly match registration targets in the region of overlap 1150, thereby enabling the registration procedure to be properly completed.

Figure 12:
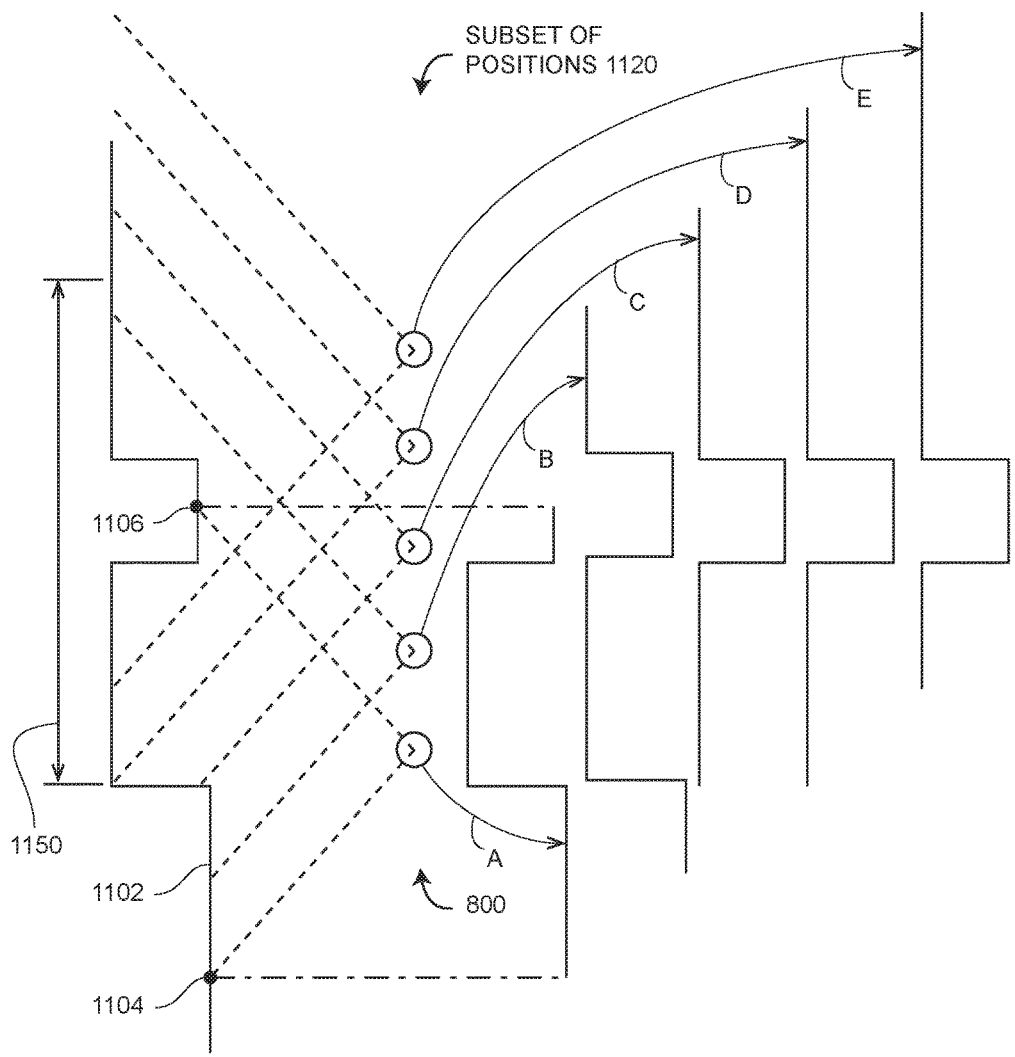
FIG. 12 shows a 2D scanner capturing portions of the object from a plurality of positions according to an embodiment.

FIG. 12 shows the 2D scanner 910 collecting 2D scan data at selected positions 1120 over an effective FOV 1140. At different positions 1120, the 2D scanner captures a portion of the object 1102 marked A, B, C, D, and E. FIG. 12 shows 2D scanner moving in time relative to a fixed frame of reference of the object 1102.

Figure 13:
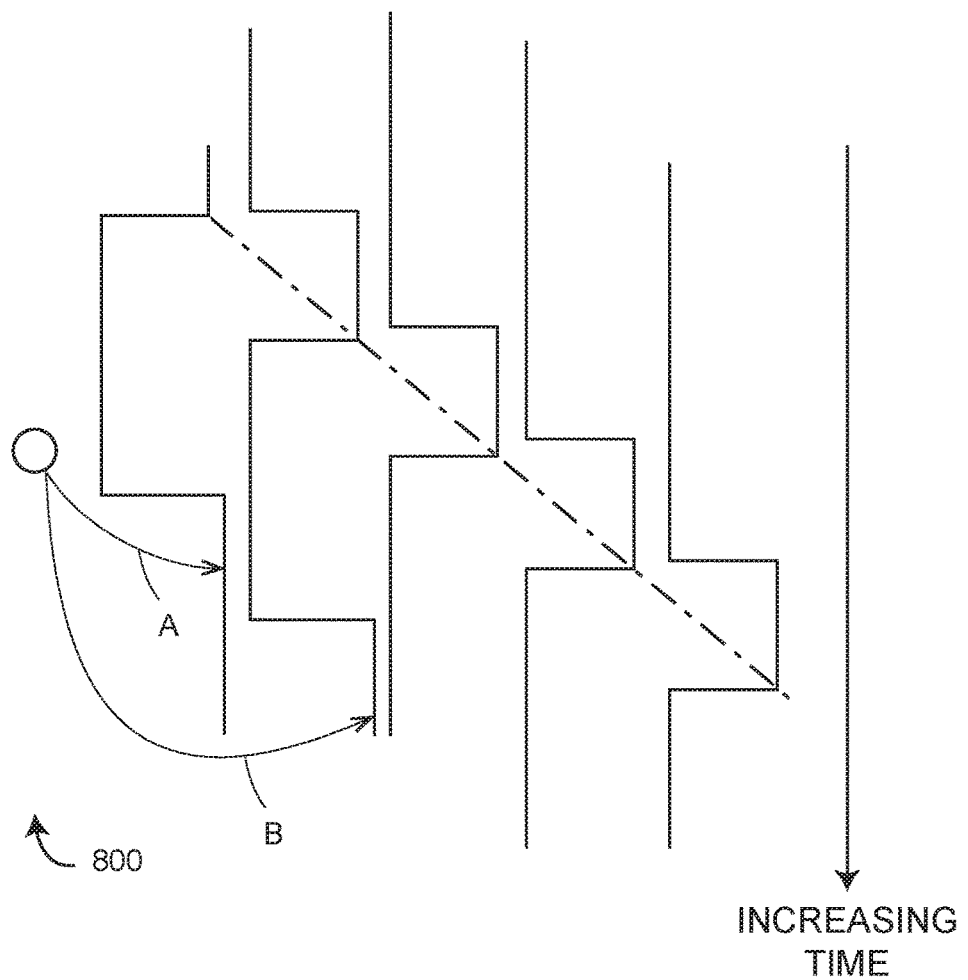
FIG. 13 shows the 2D scanner capturing portions of the object from a plurality of positions, as seen from a frame of reference of the 2D scanner, according to an embodiment.

FIG. 13 includes the same information as FIG. 12 but shows it from the frame of reference of the 2D scanner 910 rather than the frame of reference of the object 1102. This figure makes clear that in the 2D scanner frame of reference, the position of features on the object change over time. Hence it is clear that the distance traveled by the 2D scanner 910 can be determined from the 2D scan data sent from the 2D scanner accessory 810 to the processor system 950.

Figure 14A:
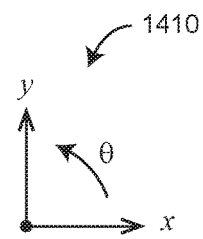
FIGS. 14A, 14B and 14C illustrate a method for finding changes in the position and orientation of the 2D scanner over time according to an embodiment.
Figure 14B:
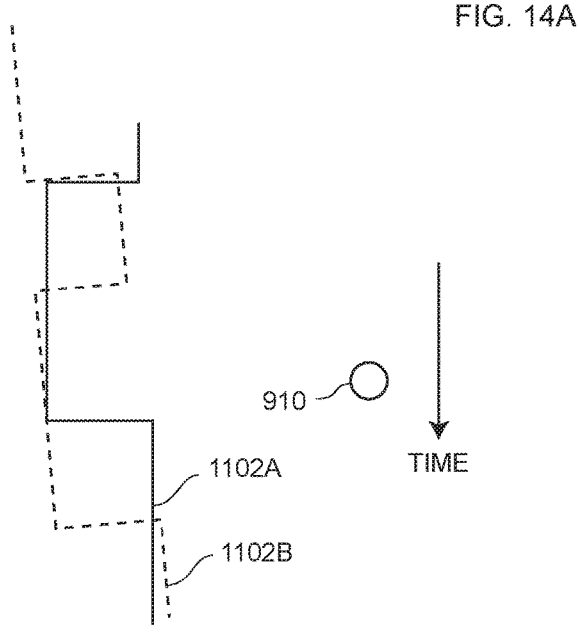
Figure 14C:
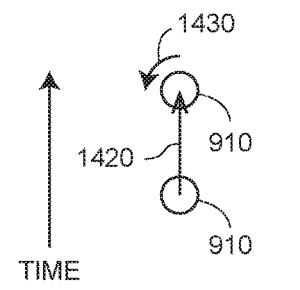

FIG. 14A shows a coordinate system that may be used in FIGS. 14B and 14C. In an embodiment, the 2D coordinates x and y are selected to lie on the plane of the 2D scanner 910. The angle θ is selected as a rotation angle relative to an axis such as x or y. FIGS. 14B, 14C represent a realistic case in which the 2D scanner 910 is moved not exactly on a straight line, for example, nominally parallel to the object 1102, but also to the side. Furthermore, the 2D scanner 910 may be rotated as it is moved.

FIG. 14B shows the movement of the object 1102 as seen from the frame of reference of the 2D scanner 910. In the 2D scanner frame of reference (that is, as seen from the 2D scanner's point of view), the object 1102 is moving while the 2D scanner 910 is fixed in place. In this frame of reference, the portions of the object 1102 seen by the 2D scanner 910 appear to translate and rotate in time. The 2D scanner accessory 810 provides a succession of such translated and rotated 2D scans to the processor system 950. In the example shown in FIGS. 14A, B, the scanner translates in the +y direction by a distance 1420 shown in FIG. 14B and rotates by an angle 1430, which in this example is +5 degrees. Of course, the scanner could equally well have moved in the +x or −x direction by a small amount. To determine the movement of the 2D scanner 910 in the x, y, θ directions, the processor system 950 uses the data recorded in successive scans as seen in the frame of reference of the 2D scanner 910, as shown in FIG. 14B. In an embodiment, the processor system 950 performs a best-fit calculation using methods well known in the art to match the two scans or features in the two scans as closely as possible.

As the 2D scanner 910 takes successive 2D readings and performs best-fit calculations, the processor system 950 keeps track of the translation and rotation of the 2D scanner, which is the same as the translation and rotation of the 3D scanner 20 and the measuring device 800. In this way, the processor system 950 is able to accurately determine the change in the values of x, y, θ as the measuring device 800 moves from the first registration position 1112 to the second registration position 1114.

It is important to understand that the processor system 950 determines the position and orientation of the 3D measuring device 800 based on a comparison of the succession of 2D scans and not on fusion of the 2D scan data with 3D scan data provided by the 3D scanner 20 at the first registration position 1112 or the second registration position 1114.

Figure 11:
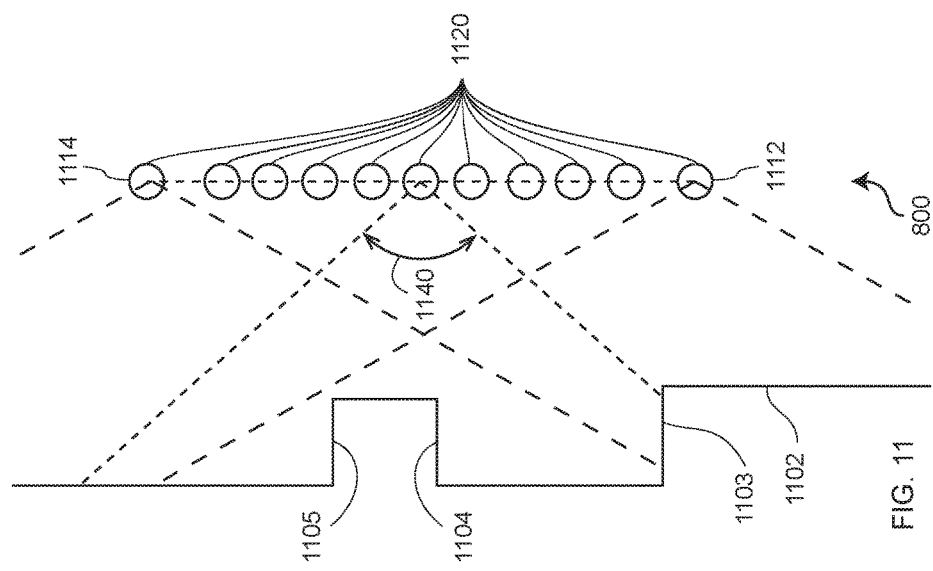
FIG. 11 is a schematic representation of a 2D scanner measuring the object from a plurality of intermediate positions according to an embodiment.

Instead, the processor system 950 is configured to determine a first translation value, a second translation value, and a first rotation value that, when applied to a combination of the first 2D scan data and second 2D scan data, results in transformed first 2D data that matches transformed second 2D data as closely as possible according to an objective mathematical criterion. In general, the translation and rotation may be applied to the first scan data, the second scan data, or to a combination of the two. For example, a translation applied to the first data set is equivalent to a negative of the translation applied to the second data set in the sense that both actions produce the same match in the transformed data sets. An example of an "objective mathematical criterion" is that of minimizing the sum of squared residual errors for those portions of the scan data judged to overlap. Another type of objective mathematical criterion may involve a matching of multiple features identified on the object. For example, such features might be the edge transitions 1103, 1104, and 1105 shown in FIG. 11B. The mathematical criterion may involve processing of the raw data provided by the 2D scanner accessory 810 to the processor system 950, or it may involve a first intermediate level of processing in which features are represented as a collection of line segments using methods that are known in the art, for example, methods based on the Iterative Closest Point (ICP). Such a method based on ICP is described in Censi, A., "An ICP variant using a point-to-line metric," IEEE International Conference on Robotics and Automation (ICRA) 2008.

In an embodiment, the first translation value is dx, the second translation value is dy, and the first rotation value d$\theta$. If the first scan data is collected with the 2D scanner 910 having translational and rotational coordinates (in a reference coordinate system) of $(x_1, y_1, \theta_1)$, then when the second 2D scan data is collected at a second location the coordinates are given by $(x_2, y_2, \theta_2) = (x_1 + dx, y_1 + dy, \theta_1 + d\theta)$. In an embodiment, the processor system 950 is further configured to determine a third translation value (for example, dz) and a second and third rotation values (for example, pitch and roll). The third translation value, second rotation value, and third rotation value may be determined based at least in part on readings from the position/orientation sensor 920.

The 2D scanner 910 collects 2D scan data at the first registration position 1112 and more 2D scan data at the second registration position 1114. In some cases, these scans may suffice to determine the position and orientation of the 3D measuring device at the second registration position 1114 relative to the first registration position 1112. In other cases, the two sets of 2D scan data are not sufficient to enable the processor system 950 to accurately determine the first translation value, the second translation value, and the first rotation value. This problem may be avoided by collecting 2D scan data at intermediate scan locations 1120. In an embodiment, the 2D scan data is collected and processed at regular intervals, for example, once per second. In this way, features are easily identified in successive 2D scans 1120. If more than two 2D scans are obtained, the processor system 950 may choose to use the information from all the successive 2D scans in determining the translation and rotation values in moving from the first registration position 1112 to the second registration position 1114. Alternatively, the processor may choose to use only the first and last scans in the final calculation, simply using the intermediate 2D scans to ensure proper correspondence of matching features. In most cases, accuracy of matching is improved by incorporating information from multiple successive 2D scans.

The first translation value, the second translation value, and the first rotation value are the same for the 2D scanner, the 3D scanner, and the 3D measuring device since all are rigidly held relative to the others.

The 3D measuring device 800 is moved to the second registration position 1114. In an embodiment, the 3D measuring device 800 is brought to a stop and brakes are locked to hold the 3D scanner stationary. In an alternative embodiment, the processor system 950 starts the 3D scan automatically when the moveable platform is brought to a stop, for example, by the position/orientation sensor 920 noting the lack of movement. The 3D scanner 20 in the 3D measuring device 800 takes a 3D scan of the object 1102. This 3D scan is referred to as the second 3D scan to distinguish it from the first 3D scan taken at the first registration position.

The processor system 950 applies the already calculated first translation value, the second translation value, and the first rotation value to adjust the position and orientation of the second 3D scan relative to the first 3D scan. This adjustment, which may be considered to provide a "first alignment," brings the registration targets (which may be natural features in the overlap region 1150) into close proximity. The processor system 950 performs a fine registration in which it makes fine adjustments to the six degrees of freedom of the second 3D scan relative to the first 3D scan. It makes the fine adjustment based on an objective mathematical criterion, which may be the same as or different than the mathematical criterion applied to the 2D scan data. For example, the objective mathematical criterion may be that of minimizing the sum of squared residual errors for those portions of the scan data judged to overlap. Alternatively, the objective mathematical criterion may be applied to a plurality of features in the overlap region. The mathematical calculations in the registration may be applied to raw 3D scan data or to geometrical representations of the 3D scan data, for example, by a collection of line segments.

Outside the overlap region 1150, the aligned values of the first 3D scan and the second 3D scan are combined in a registered 3D data set. Inside the overlap region, the 3D scan values included in the registered 3D data set are based on some combination of 3D scanner data from the aligned values of the first 3D scan and the second 3D scan.

Figure 15:
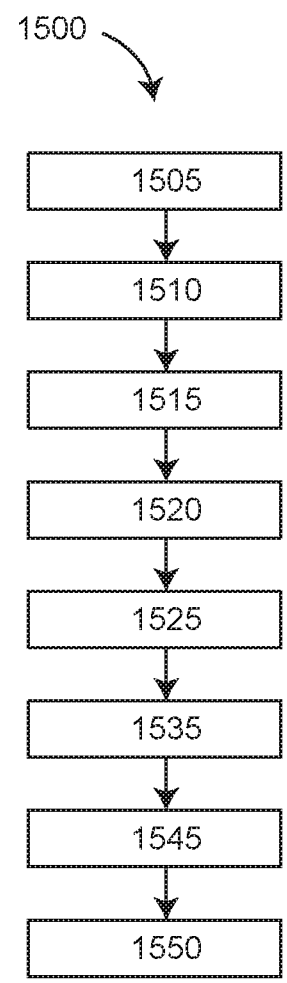
FIG. 15 includes steps in a method for measuring and registering 3D coordinates with a 3D measuring device according to an embodiment.

FIG. 15 shows elements of a method 1500 for measuring and registering 3D coordinates.

An element 1505 includes providing a 3D measuring device that includes a processor system, a 3D scanner, a 2D scanner, and a moveable platform. The processor system has at least one of a 3D scanner controller, a 2D scanner processor, an external computer, and a cloud computer configured for remote network access. Any of these processing elements within the processor system may include a single processor or multiple distributed processing elements, the processing elements being a microprocessor, digital signal processor, FPGA, or any other type of computing device. The processing elements have access to computer memory. The 3D scanner has a first light source, a first beam steering unit, a first angle measuring device, a second angle measuring device, and a first light receiver. The first light source is configured to emit a first beam of light, which in an embodiment is a beam of laser light. The first beam steering unit is provided to steer the first beam of light to a first direction onto a first object point. The beam steering unit may be a rotating mirror such as the mirror 26 or it may be another type of beam steering mechanism. For example, the 3D scanner may contain a base onto which is placed a first structure that rotates about a vertical axis, and onto this structure may be placed a second structure that rotates about a horizontal axis. With this type of mechanical assembly, the beam of light may be emitted directly from the second structure and point in a desired direction. Many other types of beam steering mechanisms are possible. In most cases, a beam steering mechanism includes one or two motors. The first direction is determined by a first angle of rotation about a first axis and a second angle of rotation about a second axis. The first angle measuring device is configured to measure the first angle of rotation and the second angle measuring device configured to measure the second angle of rotation. The first light receiver is configured to receive first reflected light, the first reflected light being a portion of the first beam of light reflected by the first object point. The first light receiver is further configured to produce a first electrical signal in response to the first reflected light. The first light receiver is further configured to cooperate with the processor system to determine a first distance to the first object point based at least in part on the first electrical signal, and the 3D scanner is configured to cooperate with the processor system to determine 3D coordinates of the first object point based at least in part on the first distance, the first angle of rotation and the second angle of rotation. The 2D scanner accessory includes a 2D scanner having a second light source, a second beam steering unit, a third angle measuring device, and a second light receiver. The second light source is configured to emit a second beam of light. The second beam steering unit is configured to steer the second beam of light to a second direction onto a second object point. The second direction is determined by a third angle of rotation about a third axis, the third angle measuring device being configured to measure the third angle of rotation. The second light receiver is configured to receive second reflected light, where the second reflected light is a portion of the second beam of light reflected by the second object point. The second light receiver is further configured to produce a second electrical signal in response to the second reflected light. The 2D scanner is configured to cooperate with the processor system to determine a second distance to the second object point based at least in part on the second electrical signal. The 2D scanner is further configured to cooperate with the processor system to determine 2D coordinates of the second object point based at least in part on the second distance and the third angle of rotation. The moveable platform is configured to carry the 3D scanner and the 2D scanner. The 3D scanner is fixed relative to the 2D scanner, and the moveable platform is configured for motion on a plane perpendicular to the third axis.

An element 1510 includes determining with processor system, in cooperation with the 3D scanner, 3D coordinates of a first collection of points on an object surface while the 3D scanner is fixedly located at a first registration position.

An element 1515 includes obtaining by the 2D scanner in cooperation with the processor system a plurality of 2D scan sets. Each of the plurality of 2D scan sets is a set of 2D coordinates of points on the object surface collected as the 2D scanner moves from the first registration position to a second registration position. Each of the plurality of 2D scan sets is collected by the 2D scanner at a different position relative to the first registration position.

An element 1520 includes determining by the processor system a first translation value corresponding to a first translation direction, a second translation value corresponding to a second translation direction, and a first rotation value corresponding to a first orientational axis, wherein the first translation value, the second translation value, and the first rotation value are determined based at least in part on a fitting of the plurality of 2D scan sets according to a first mathematical criterion.

An element 1525 includes determining with the processor system, in cooperation with the 3D scanner, 3D coordinates of a second collection of points on the object surface while the 3D scanner is fixedly located at the second registration position.

An element 1535 includes identifying by the processor system a correspondence among registration targets present in both the first collection of points and the second collection of points, the correspondence based at least in part on the first translation value, the second translation value, and the first rotation value.

An element 1545 includes determining 3D coordinates of a registered 3D collection of points based at least in part on a second mathematical criterion, the correspondence among the registration targets, the 3D coordinates of the first collection of points and the 3D coordinates of the second collection of points. An element 1550 includes storing the 3D coordinates of the registered 3D collection of points.

Terms such as processor, controller, computer, DSP, FPGA are understood in this document to mean a computing device that may be located within an instrument, distributed in multiple elements throughout an instrument, or placed external to an instrument.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A three-dimensional (3D) measuring device comprising:
   one or more processors;
   a 3D scanner operable to cooperate with the one or more processors to determine 3D coordinates of a first object point, the 3D scanner being movable from a first position to a second position;
   a 2D scanner operably coupled to the 3D scanner, the 2D scanner being operable to cooperate with the one or more processors to determine 2D coordinates of a second object point, the 2D scanner being movable from a third position to a fourth position;
   wherein the one or more processors responsive to executable instructions which when executed by the processor system is operable to:
      cause the 3D scanner, while positioned at a first position, to determine 3D coordinates of a first collection of points on an object surface;
      cause the 2D scanner, while moving from the third position to the fourth position, to obtain a plurality of 2D scan sets, each of the plurality of 2D scan sets being a set of 2D coordinates of points on the object surface collected by the 2D scanner at a different position relative to the first position;
      determine a first translation value, a second translation value, and a first rotation value based at least in part on a fitting of the plurality of 2D scan sets;
      cause the 3D scanner, positioned at the second position, to determine 3D coordinates of a second collection of points on the object surface;
      identify a correspondence between registration targets in the first collection of points and the second collection of points based at least in part on the first translation value, the second translation value, and the first rotation value; and
      determine 3D coordinates of a registered 3D collection of points based on a correspondence among registration targets, the 3D coordinates of the first collection of points, and the 3D coordinates of the second collection of points.

2. The device of claim 1, wherein:
   the 3D scanner includes a first light source and a first light receiver;
   the 2D scanner having a second light source and a second light receiver;
   the determination of the 3D coordinates of the first object point is based at least in part on a first light emitted from the first light source that is reflected off of the first object point and received by the first light receiver; and
   the determination of the 2D coordinates of the second object point is based at least in part on a second light emitted by the second light source that is reflected off of the second object point and received by the second light receiver.

3. The device of claim 2, further comprising a sensor operably coupled to the 2D scanner, the sensor being operable to determine a position and orientation of the sensor.

4. The device of claim 3, wherein the position orientation sensor includes at least one sensor selected from the group consisting of an inclinometer, a gyroscope, a magnetometer, and an altimeter.

5. The device of claim 1, further comprising a movable member, the 3D scanner and 2D scanner being coupled to the movable member.

6. The device of claim 1, wherein the registration targets are natural features of the object surface.

7. A three-dimensional (3D) measuring device comprising:
one or more processors;
a 3D scanner operable to cooperate with the one or more processors to determine 3D coordinates of a first object point, the 3D scanner being movable from a first position to a second position;
a 2D scanner operably coupled to the 3D scanner, the 2D scanner being operable to cooperate with the one or more processors to determine 2D coordinates of a second object point, the 2D scanner being movable from a third position to a fourth position;
wherein the one or more processors responsive to executable instructions which when executed by the processor system is operable to:
cause the 3D scanner, while positioned at a first position, to determine 3D coordinates of a first collection of points on an object surface;
cause the 2D scanner, while moving from the third position to the fourth position, to obtain a plurality of 2D scan sets, each of the plurality of 2D scan sets being a set of 2D coordinates of points on the object surface collected by the 2D scanner at a different position relative to the first position;
determine a first translation value, a second translation value, and a first rotation value based at least in part on a fitting of the plurality of 2D scan sets;
cause the 3D scanner, positioned at the second position, to determine 3D coordinates of a second collection of points on the object surface;
identify a correspondence between registration targets in the first collection of points and the second collection of points based at least in part on the first translation value, the second translation value, and the first rotation value; and
determine 3D coordinates of a registered 3D collection of points based on a correspondence among registration targets, the 3D coordinates of the first collection of points, and the 3D coordinates of the second collection of points;
wherein the 3D scanner includes a first light source and a first light receiver;
wherein the 2D scanner having a second light source and a second light receiver;
wherein the determination of the 3D coordinates of the first object point is based at least in part on a first light emitted from the first light source that is reflected off of the first object point and received by the first light receiver;
wherein the determination of the 2D coordinates of the second object point is based at least in part on a second light emitted by the second light source that is reflected off of the second object point and received by the second light receiver; and wherein the determination of the 3D coordinates of the first object point is further based at least in part on the speed of light in air.

8. A three-dimensional (3D) measuring device comprising:
one or more processors;
a 3D scanner operable to cooperate with the one or more processors to determine 3D coordinates of a first object point, the 3D scanner being movable from a first position to a second position;
a 2D scanner operably coupled to the 3D scanner, the 2D scanner being operable to cooperate with the one or more processors to determine 2D coordinates of a second object point, the 2D scanner being movable from a third position to a fourth position;
wherein the one or more processors responsive to executable instructions which when executed by the processor system is operable to:
cause the 3D scanner, while positioned at a first position, to determine 3D coordinates of a first collection of points on an object surface;
cause the 2D scanner, while moving from the third position to the fourth position, to obtain a plurality of 2D scan sets, each of the plurality of 2D scan sets being a set of 2D coordinates of points on the object surface collected by the 2D scanner at a different position relative to the first position;
determine a first translation value, a second translation value, and a first rotation value based at least in part on a fitting of the plurality of 2D scan sets;
cause the 3D scanner, positioned at the second position, to determine 3D coordinates of a second collection of points on the object surface;
identify a correspondence between registration targets in the first collection of points and the second collection of points based at least in part on the first translation value, the second translation value, and the first rotation value; and
determine 3D coordinates of a registered 3D collection of points based on a correspondence among registration targets, the 3D coordinates of the first collection of points, and the 3D coordinates of the second collection of points;
wherein the one or more processors are further responsive to causing the 3D scanner to automatically perform a scan of the object surface in response to stopping at the second position.

9. A method of determining three dimension coordinates, the method comprising:
scanning an object surface with a 3D scanner positioned at a first position, to determine 3D coordinates of a first collection of points on the object surface, the 3D scanner being movable from the first position to a second position;
scanning with a 2D scanner while moving the 2D scanner from a third position to a fourth position, to obtain a plurality of 2D scan sets, each of the plurality of 2D scan sets being a set of 2D coordinates of points on the object surface collected by the 2D scanner at a different position relative to the first position, the 2D scanner being operably coupled to the 3D scanner;
determining with one or more processors a first translation value, a second translation value, and a first rotation value based at least in part on a fitting of the plurality of 2D scan sets, the one or more processors being operably coupled to the 3D scanner and the 2D scanner;

scanning the object surface with the 3D scanner positioned at the second position to determine 3D coordinates of a second collection of points on the object surface;

identifying with the one or more processors a correspondence between registration targets in the first collection of points and the second collection of points based at least in part on the first translation value, the second translation value, and the first rotation value; and determining with the one or more processors 3D coordinates of a registered 3D collection of points based on a correspondence among registration targets, the 3D coordinates of the first collection of points, and the 3D coordinates of the second collection of points.

10. The method of claim 9, further comprising determining a position and orientation of the 2D scanner as the 2D scanner is moved from the third position to the fourth position.

11. The method of claim 10, wherein the determination of the position and orientation of the 2D scanner is determined by a sensor selected from a group consisting of an inclinometer, a gyroscope, a magnetometer, and an altimeter.

12. The method of claim 9, further comprising moving the 3D scanner from the first position to the second position as the 2D scanner is moved from the third position to the fourth position.

13. The method of claim 9, wherein the scanning at the second position is performed automatically by the 3D scanner in response to the 3D scanner stopping at the second position.

* * * * *